United States Patent [19]

Buchanan et al.

[11] Patent Number: 5,267,155

[45] Date of Patent: Nov. 30, 1993

[54] APPARATUS AND METHOD FOR COMPUTER-ASSISTED DOCUMENT GENERATION

[75] Inventors: Ken Buchanan, Eagan; John A. Dowdle, St. Paul, both of Minn.

[73] Assignee: Medical Documenting Systems, Inc., St. Paul, Minn.

[21] Appl. No.: 847,292

[22] Filed: Mar. 6, 1992

Related U.S. Application Data

[63] Continuation-in-part of Ser. No. 422,139, Oct. 16, 1989.

[51] Int. Cl.$^5$ ............................................. G06F 15/21
[52] U.S. Cl. ............................................... 364/419.14
[58] Field of Search ................... 364/419, 943, 943.1, 364/943.5, 957, 222.81, 222.82, 225.6, 413.01

[56] References Cited

U.S. PATENT DOCUMENTS

| | | | |
|---|---|---|---|
| 3,872,462 | 3/1975 | Lemelson | 340/324 |
| 3,934,226 | 1/1976 | Stone et al. | 340/172.5 |
| 4,348,744 | 9/1982 | White | 364/900 |
| 4,491,725 | 1/1985 | Pritchard | 235/375 |
| 4,591,974 | 5/1986 | Dornbush et al. | 364/200 |
| 4,794,386 | 12/1988 | Bedrij et al. | 340/724 |
| 4,835,690 | 5/1989 | Gangarosa et al. | 364/413.13 |
| 4,839,822 | 6/1989 | Dormond et al. | 364/413.02 |
| 4,959,769 | 9/1990 | Cooper | 364/200 |
| 4,962,475 | 10/1990 | Hernandez et al. | 364/900 |

FOREIGN PATENT DOCUMENTS

0216063 4/1987 European Pat. Off. .

OTHER PUBLICATIONS

*AFIPS Conference Proceedings,* 9-12 Jul. 1984, J. Sprowl et al., "An Expert System for Drafting Legal Documents".

*IBM Technical Disclosure Bulletin,* vol. 21, No. 11, Apr. 1979, R. J. Gerlach et al., "System for Simplified Form Fill-In Using CRT Display".

*M. D. Computing,* vol. 2, No. 3, 1985, M. Cushing, Jr., M.D., "Doctor's Office Manager: An IBM Billing Package".

*Data Communications,* Nov. 1986, E. G. Principi et al., "Better Care, Shorter Stays, Thanks to Networking".

*Nursing Economics,* vol. 5, No. 1, Jan./Feb. 1987, M. M. Mowry et al., "Evaluating Automated Information Systems" and Automated Information Systems in Quality Assurance.

*Software In Health Care,* 1985, R. A. Korpman, M.D., "Patient Care Information Systems: Looking to the Future".

Primary Examiner—Roy N. Envall, Jr.
Assistant Examiner—Jennifer L. Hazard
Attorney, Agent, or Firm—Merchant, Gould, Smith, Edell, Welter & Schmidt

[57] ABSTRACT

A document generation system for enhancing or replacing the dictation and transcription process. More particularly, a computer-based documentation system is provided which processes document templates in conjunction with pre-defined character strings to generate user-defined reports or documents. Each document template is composed of "boiler plate" text and "holes". A system and method are described for controlling, via a relational database, the selection of pre-defined character strings to be inserted into document template "holes". A second method is described for inserting user-defined or concatenated character strings into selected document template "holes".

27 Claims, 18 Drawing Sheets

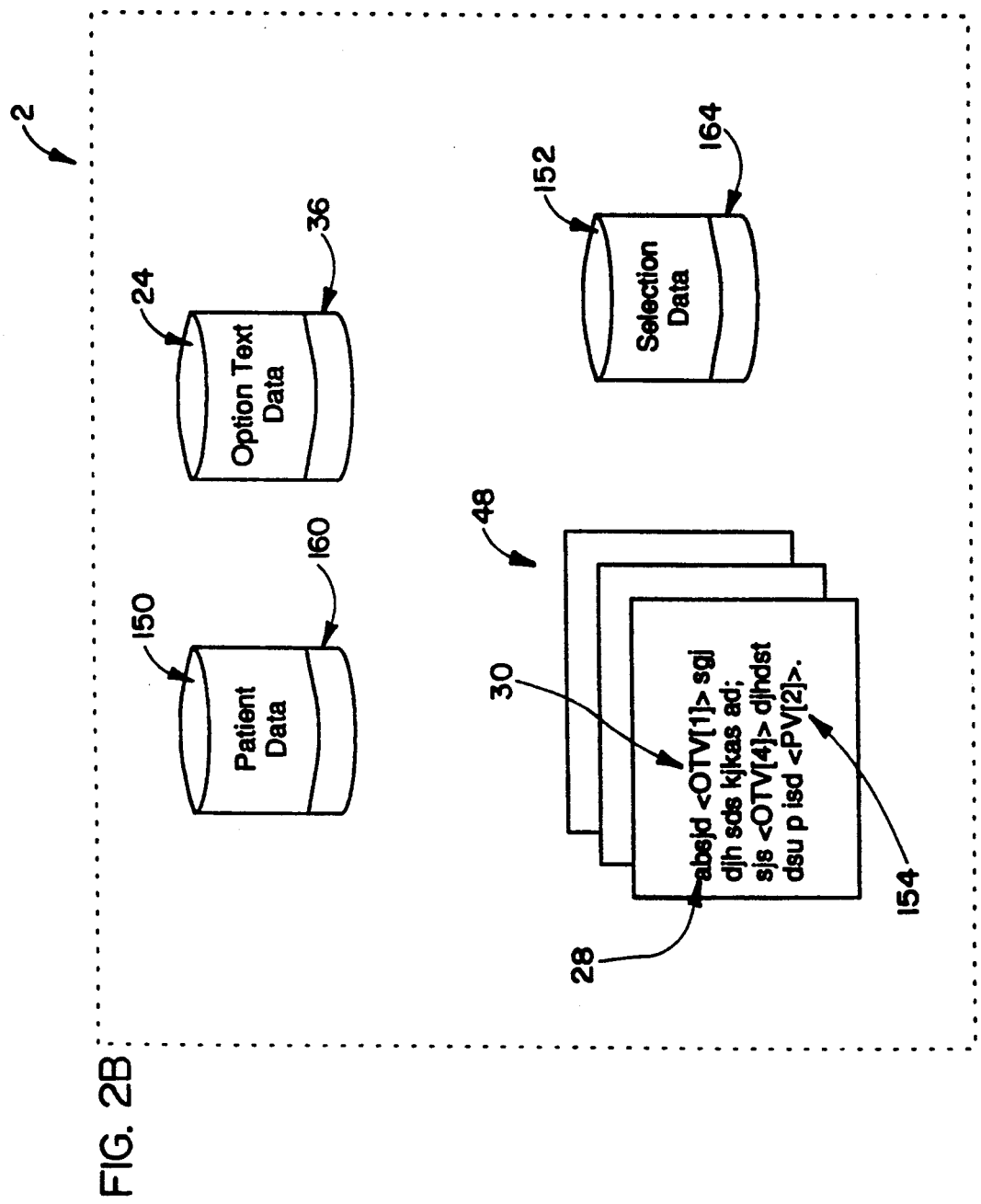

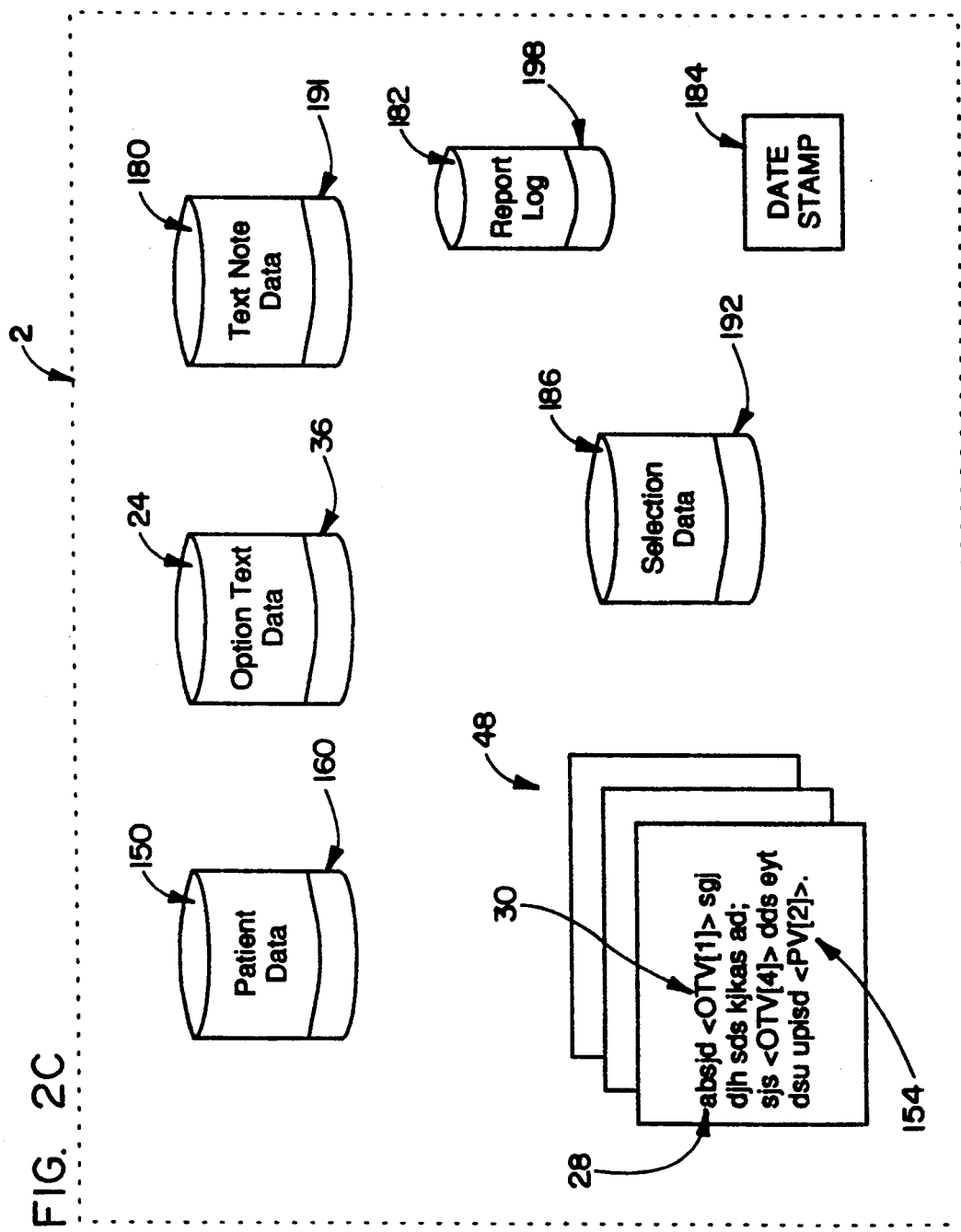

| OPTION-TEXT VARIABLES | S[1] | S[2] | S[3] | S[4] | S[5] | S[6] | ... | S[N] |
|---|---|---|---|---|---|---|---|---|
| OTV[1] | | | | | | | | |
| OTV[2] | | | | | | | | |
| OTV[3] | | | | | | | | |
| OTV[4] | | | | | | | | |
| OTV[5] | | | | | | | | |
| ⋮ | | | | | | | | |
| OTV[N[OTV]] | | | | | | | | |

FIG. 3A

| DOCUMENT TEMPLATE IDENTIFIER | VARIABLE | SELECTION |
|---|---|---|
| DT[1] | OTV[2] | S[1] |
| DT[1] | OTV[6] | S[2] |
| DT[1] | OTV[1] | S[4] |
| DT[1] | OTV[4] | S[3] |
| DT[2] | OTV[1] | S[2] |
| DT[2] | OTV[2] | S[1] |
| DT[2] | OTV[5] | S[6] |

FIG. 3B

| PATIENT VARIABLES | P[1] | P[2] | P[3] | P[4] | P[5] | P[6] | ... | P[M] |
|---|---|---|---|---|---|---|---|---|
| PV[1] | | | | | | | | |
| PV[2] | | | | | | | | |
| PV[3] | | | | | | | | |
| PV[4] | | | | | | | | |
| PV[5] | | | | | | | | |
| ⋮ | | | | | | | | |
| PV[N[PV]] | | | | | | | | |

FIG. 4A

| DOCUMENT TEMPLATE IDENTIFIER | VARIABLE | SELECTION INDICATOR | PATIENT IDENTIFIER |
|---|---|---|---|
| DT[1] | PV[2] | S[1] | P[3] |
| DT[1] | PV[6] | S[2] | P[3] |
| DT[1] | OTV[1] | S[4] | P[3] |
| DT[1] | OTV[4] | S[3] | P[3] |
| DT[2] | OTV[1] | S[2] | P[6] |
| DT[2] | OTV[2] | S[1] | P[6] |
| DT[2] | OTV[5] | S[6] | P[6] |

FIG. 4B

| DOCUMENT TEMPLATE IDENTIFIER | PATIENT IDENTIFIER | DATE |
|---|---|---|
| DT[1] | P[3] | 3-4-92 |
| DT[1] | P[4] | 2-7-92 |
| DT[1] | P[1] | 3-1-92 |
| DT[1] | P[3] | 2-7-92 |
| DT[2] | P[3] | 3-4-92 |
| DT[2] | P[2] | 2-14-92 |
| DT[2] | P[5] | 3-3-92 |

FIG. 5A

| DOCUMENT TEMPLATE IDENTIFIER | VARIABLE | SELECTION INDICATOR | PATIENT IDENTIFIER | DATE |
|---|---|---|---|---|
| DT[1] | PV[2] | | P[3] | 3-4-92 |
| DT[1] | PV[6] | | P[3] | 3-4-92 |
| DT[1] | OTV[1] | | P[3] | 3-4-92 |
| DT[1] | OTV[4] | | P[3] | 3-1-92 |
| DT[2] | OTV[1] | | P[6] | 12-11-91 |
| DT[2] | OTV[2] | | P[6] | 12-11-91 |
| DT[2] | OTV[5] | | P[6] | 12-11-91 |

FIG. 5B

| OPTION-TEXT VARIABLES | S[1] | S[2] | ... | S[N] | B[1] | B[2] | ... | B[N] |
|---|---|---|---|---|---|---|---|---|
| OTV[1] | | | | | | | | |
| OTV[2] | | | | | | | | |
| OTV[3] | | | | | | | | |
| OTV[4] | | | | | | | | |
| OTV[5] | | | | | | | | |
| ⋮ | | | | | | | | |
| OTV[N[OTV]] | | | | | | | | |

FIG. 6

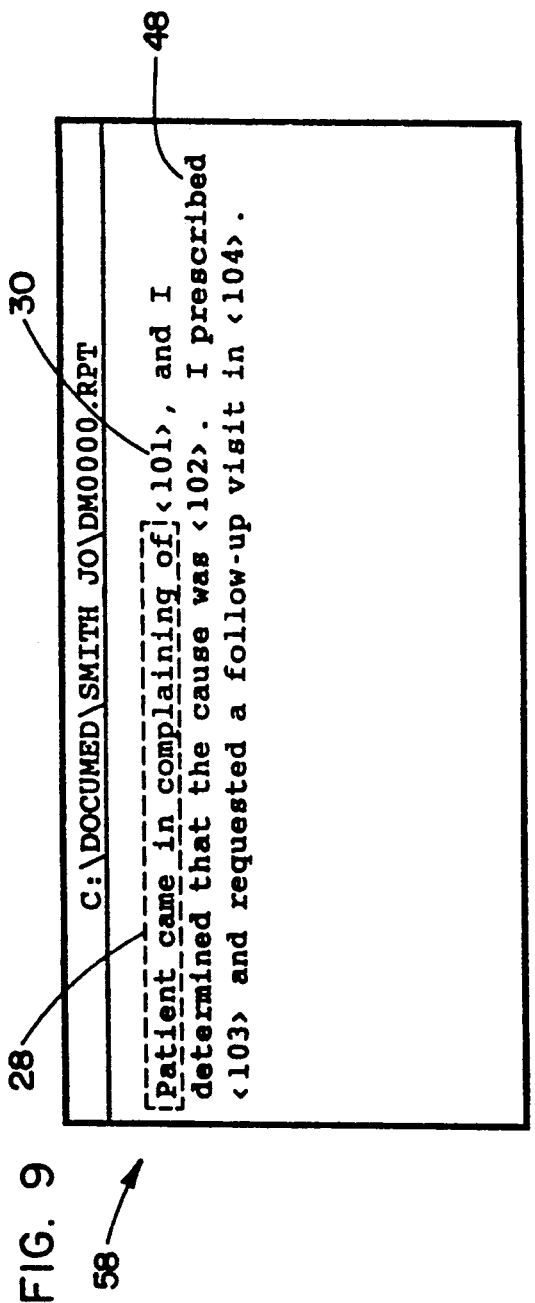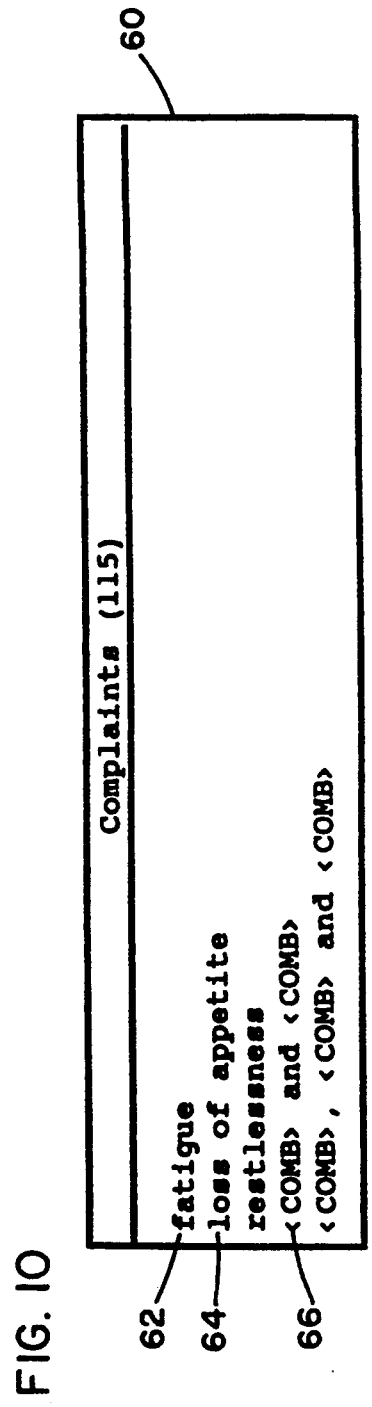

```
Jan 1, 1989        DocuMED 1.0              11 37 AM
     Control  Document  Report  Format  Locate  Print
                    Enter Patient Information Last name        First name      MI       Title      ID Number Street 1
Street2
City                                      State              Zip Home Phone                                Work Phone Height    Weight    Age      Sex          Married Occupation
Employer
Health Insurance Company
          ID #
Comments
            F2 = Clear   F5 = Accept   ESC = Abandon
```

FIG. 12

Jan 1, 1989          DocuMED 1.0                    11 37 AM
       Control   Document   Report   Format   Locate   Print
                  C:\DOCUMED\SMITH_JO\DM0004.RPT Present Symptoms: The patient is seen <#44> with low back pain.
The pain is described as <169> and appears to be <412>.
At its best, the pain is desc ┌─────────────┐ orst, the pain is
described <413>. The worst t │ Date of Today│       pain is <171> and
the best time of the day is < │              │ tion for sitting
is <175> and the maximum for │ A. <DATE>    │ patient sleeps
about <178>. The following de│ B. <KBD>     │ ain response to
various activities and functions:└─────────────┘

Activity/function                    Response sitting                              <161>
  prolonged standing                   <162>

┌──────────────────────────────────┐
        │                                  │
        │       Manual entry -->           │
        │                                  │
        └──────────────────────────────────┘

File:

RPT: Present Symptoms   PAT: Jones, John J.   USER: Smith

FIG. 13

APPARATUS AND METHOD FOR COMPUTER-ASSISTED DOCUMENT GENERATION

This is a continuation-in-part of U.S. patent application Ser. No. 07/422,139, filed Oct. 16, 1989.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates to document generation systems and, more particularly to a system incorporating user-modifiable document templates or "boilerplates", a database including information to be placed into "holes" within a particular document template, and a computing device which combines the particular document template with relevant information stored in the database to form a document.

Traditionally, the practice of dictating and transcribing has been used to record information related to interviews, personal reminders, thoughts on a subject, and drafts or letters of other documents. In the service industries, such as consulting, legal and medical fields, professionals have been increasingly burdened by the need to document every encounter with clients or patients. This is particularly true in the medical field where physicians must record information about each patient office visit, diagnosis, suggested treatment and prescription given. In addition to recording patient information, physicians must fill out forms for submission to insurance companies and provide information to regulatory agencies. To gather and produce all of this information, physicians must spend a significant portion of their work day dictating the needed information for each record or form. Further, a physician must maintain a staff to transcribe the information into reports and to fill out required forms.

A physician typically dictates a report on each patient encounter which, subsequently, must be typed by a transcriber. The process is time consuming and repetitive. For this reason, shortcuts are often taken causing reports to be incomplete. As a result, potential legal and insurance problems as well as reduced quality of patient care can occur. Using traditional manual methods of record keeping, patient data is not readily available for fast and easy review. A patient's medical record cannot be easily combined with other reports or other patient data for analysis and reporting.

In response to the above-mentioned needs and problems encountered in the medical field, the present invention was developed. The present invention automates the documentation process by providing a computer-based documentation system incorporating a relational database with a multi-document word processor, preferably within a menu-driven, graphic window environment. The documentation system utilizes previously defined document templates or "boiler-plates" to manage patient reporting and includes a user interface for use in selecting phrases to be inserted in the template. Preferably, the system will further comprise a graphics engine for display of graphical expressions of selection analysis.

For instance, an initial exam conducted by an orthopedic surgeon will contain many basic elements common to all patients, but response to the exam will vary for each patient. A report to be input can contain any number of variable responses, and each variable within the input report can offer any number of different options from which to choose. In addition, a physician can personalize the report, modifying or creating new documents to suit a particular situation. Further, while generating a particular document, a physician can customize the document by inserting words into the generated document through the use of the integrated word processor.

In an alternative embodiment, the physician can avoid directly using the documenting system by utilizing printed checklists. After a checklist has been filled out by a physician, another individual can generate the desired documents from items checked off on the checklist.

The data input into the documenting system is electronically stored for possible future use in reporting and/or analysis. The future uses may include graphical analysis via the graphics engine, cost accounting, time reporting and other desired document generation.

It will be appreciated by those familiar with the art that such a document generation system can be utilized in a plurality of environments including medical, legal, government, insurance and other service or document generating environments. In the legal field, simple contracts, licenses or agreements could be drafted in this manner. In the government, routine status reports, procurement requests or inspection reports could be produced by such a system. In the insurance field, insurance applications could be processed, policies maintained, or claim reports prepared. These and other possible areas of use of the present invention will become apparent after reading the following detailed description.

SUMMARY OF THE INVENTION

A document generation system is provided for enhancing or replacing the dictation and transcription process. More particularly, a computer-based documentation system is provided which processes document templates in conjunction with pre-defined character strings to generate user-defined reports or documents. Each document template is composed of "boiler plate" text and "holes". A system and method are described for controlling, via a relational database, the selection of pre-defined character strings to be inserted into document template "holes". A second method is described for inserting user-defined or concatenated character strings into selected document template "holes".

According to another aspect of the document generating system, a computer-based documentation system is described in which the contents of a relational database are used to generate user-defined reports. The database described consists of a plurality of document templates, including option-text variables for use in filling the "holes" in each template, a plurality of variable records for storing pre-defined character strings to replace the option-text variables in the document templates and a selection data file for storing pointers to the selected character strings. A system and method are described for controlling, via document processing means, the selection of pre-defined character strings to be replace the option-text variables in a document template and for controlling, via document generating means, the generation of a document from pointers in the selection data file.

In addition, a branching function is described, for use within the document processing means, in which selection of a first character string to replace a first option-text variable in a document template will automatically cause a branch to a second set of character strings which can be used to replace a second option-text variable. A character string selected from this second set of character strings is then appended to the first string and the resulting character string is used to replace the first option-text variable. The method described permits almost unlimited levels of branching.

BRIEF DESCRIPTION OF THE DRAWINGS

FIGS. 2a-2c illustrate data structures within different embodiments of relational databases useful in a document generation system according to the present invention.

FIGS. 3a-3b, 4a-4b and 5a-5b are tables illustrative of some of the data structures used in embodiments of three relational databases useful in a document generation system according to the present invention.

FIG. 6 is a table illustrative of an alternate option-text data file useful in the embodiments shown in FIGS. 2a-2c.

FIG. 9 is a drawing representative of a screen display of a document template editing window for creating and editing a document template.

FIG. 10 is a drawing showing one embodiment of an option-text record editing window used for entering and editing character strings for use in replacing option-text variables, an example of an option-text list.

FIG. 12 is a drawing illustrative of a graphical approach to entering patient information.

FIG. 13 is a drawing illustrative of a screen display useful for associating user-entered character strings with an option-text variable.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
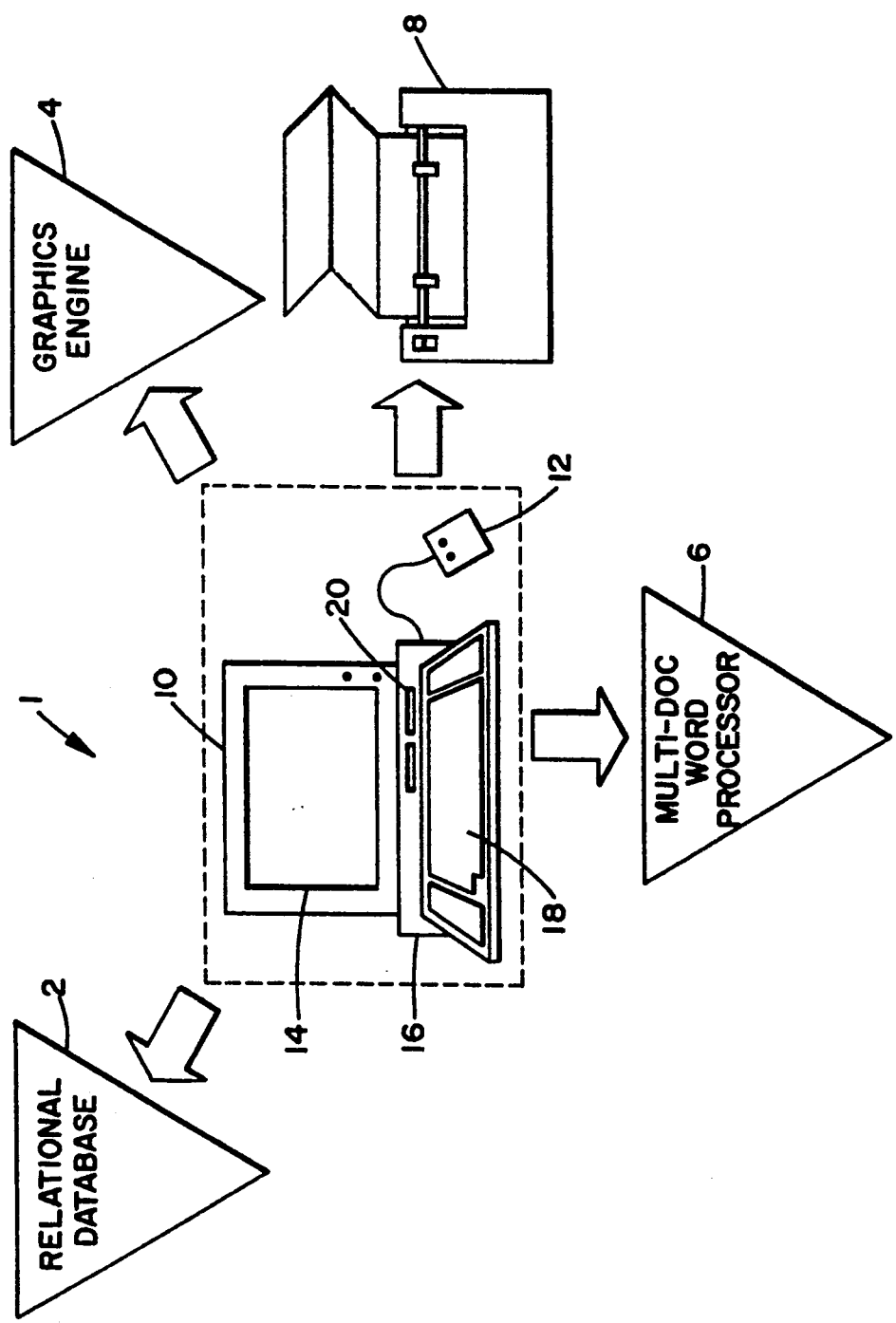
FIG. 1 is a diagram showing one embodiment of the document generation system.

FIG. 1 is a diagram of one embodiment of a document generation system. Document generation system 1 comprises a computing device 10, a relational database 2 and a multi-document word processor 6. In an alternate embodiment, document generation system 1 further comprises a graphics engine 4 which can be used to analyze data stored within relational database 2. In a second alternate embodiment, document generation system 1 further comprises a printer 8 for printing documents generated by system 1.

In the preferred embodiment, computing device 10 comprises an electronic display 14, a data processing device 16, a keyboard 18 and an electronic storage device 20. Storage device 20 is a nonvolatile storage device used for storing information within relational database 2. Electronic storage device 20 can be any device capable of storing data for long periods of time. For example, electronic storage device 20 could be a floppy disk drive, Bernoulli hard drive, Winchester hard disk, analog tape drive, digital tape drive, optical disk drive. It will be appreciated by those in the art that new or improved electronic storage devices can be utilized by the present invention as they become available for use.

In an alternate embodiment, computing device 10 further comprises pointing device 12. In that embodiment, pointing device 12 is used as an alternative input device within document generation system 1. Pointing device 12 may comprise a mouse, trackball, light pen, bar-code scanner or digitizing pad.

Document generation system 1 automates the documentation process by combining the editing power of multi-document word processor 6 with the flexible storage of relational database 2, preferably within a menu-driven, graphic window environment. Documentation system 1 utilizes previously defined document templates composed of "boiler-plate" text and information "holes" to manage patient reporting and includes a user interface for use in selecting phrases to be inserted into "holes" in the template.

Document templates can be created by the user to produce a variety of reports. The user will first design a document. He or she will then assess the document to determine the text that will change from document to document and the text that will remain static across all documents. Static text becomes the boiler-plate of the document template; varying text is replaced by option-text variables or "holes".

In the preferred menu-driven, graphic window environment of system 1, a document template is created and edited within a pop-up window. In that environment, a pop-up window appears for the document template to be created and the user then enters the static text and "holes" necessary to define the document template.

In the preferred embodiment, static text is entered through keyboard 18; a "hole" or option-text variable is generated by selecting a special function key. In that embodiment, at the "hole" location in the document template, the embodiment, at the "hole" location in the document template, the user depresses the special function key reserved for entering option-text variables. A option-text control menu then appears and the user selects the "New" selection to create an option-text variable. Upon selection, an option-text editing pop-up window appears and the user can enter phrases to be used to replace the option-text variable in the generated document. When all appropriate phrases are entered, the user exits the option-text pop-up window. Computing device 10 then saves an option-text record containing the phrases entered and places a unique variable identifier associated with the option-text record in the document template at the hole location. The user then resumes entering text into the document template. When all text and variables have been entered, the document template is complete and the user saves the template to nonvolatile memory. In the preferred embodiment, document templates are stored as ASCII files.

To use the document template, a user will select the type of report to be generated. The document template associated with that report is retrieved from nonvolatile memory and computing device 10 begins to evaluate each "hole" in the template. Evaluation consists of scanning the document template for variable identifiers. When computing device 10 finds the first variable identifier in the document template being evaluated, it lists the phrases contained in the option-text record associated with that variable identifier. The user then selects one or more of the phrases displayed, the selection(s) are recorded and computing device 10 moves to the next variable identifier. When all variables have been evaluated, a document can be generated.

In the preferred embodiment, variable identifiers are integer numbers surrounded by angle brackets (e.g. <101>). This format simplifies the variable search algorithm.

In the preferred embodiment of documentation system 1, a plurality of pre-defined document templates may also be provided. When the user wishes to generate a document from a pre-defined template, he or she calls up the document template for that document and fills in the "holes" in the template. The text used to fill the "holes" is then saved to storage device 20 where it can be used to generate the desired document.

Relational databases are used advantageously to manage the document templates and the phrases used to replace variables in the templates for documents generated within document generation system 1. A relational database comprises a series of data structures containing information linked through common fields. These structures are presented to the user as a collection of tables, each with one or more columns and zero or more unique rows. Relational database 2 uses these structures to store, retrieve and manipulate character strings used to fill "holes" in the document template. These data structures are also used to store user responses captured during document creation and to store relatively static information such as patient information. The preferred embodiment of document generation system 1 is implemented with a relational database implemented using a B-tree model. Database manipulation is performed through program calls to executable functions provided by a program called B-Tree Filer 5.0 marketed by TurboPower Software of Scotts Valley, Calif. B-Tree Filer 5.0 handles the mechanics of storing, retrieving and indexing records and templates in database 2. Those skilled in the art will recognize that document generation system 1 could be implemented through other data tree structures, or even through the use of look-up tables, without departing from the scope of the present invention.

Figure 2A:
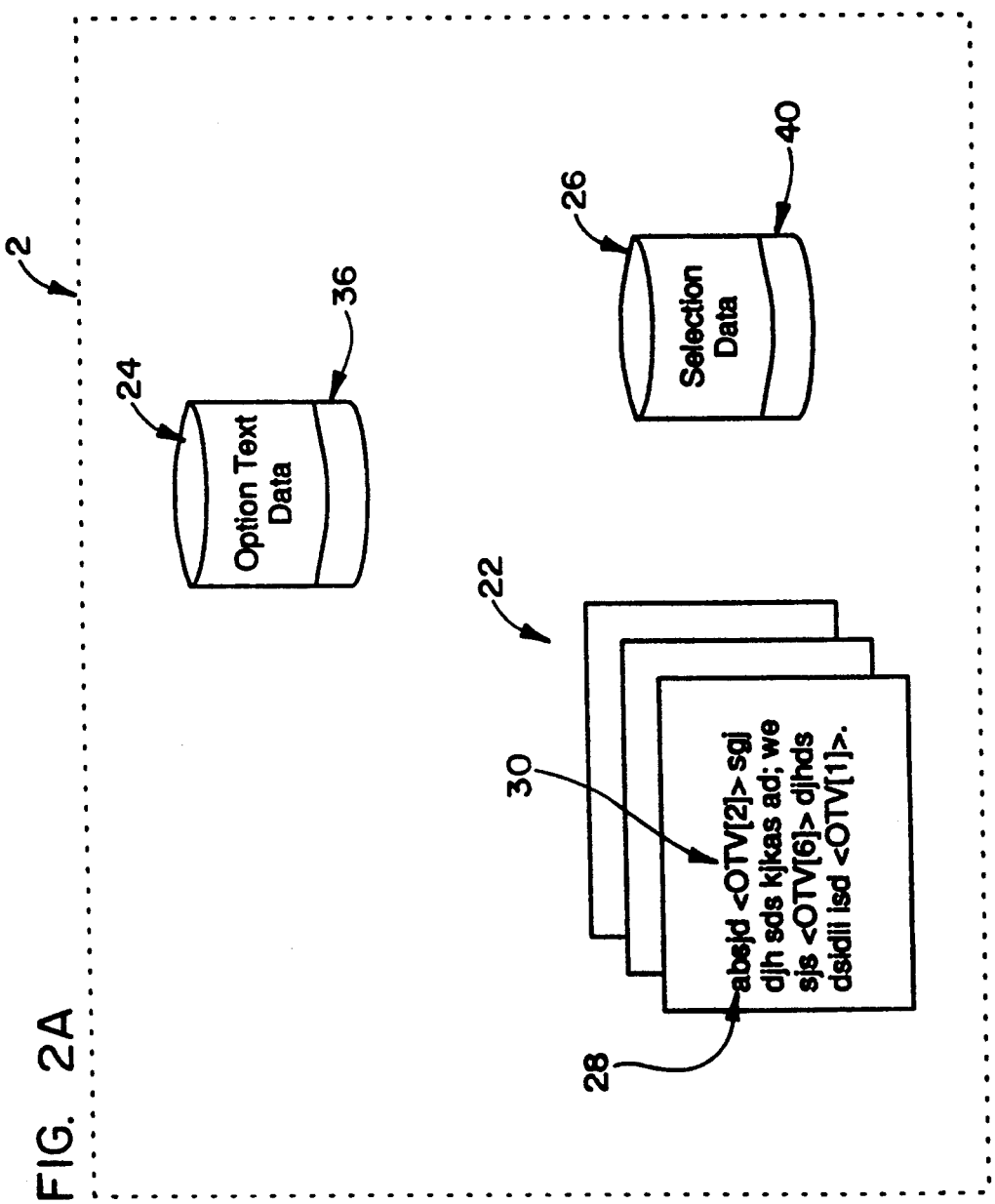

One embodiment of a relational database 2 for use in a document generation system 1 will be explained in connection with FIGS. 2A, 3A and 3B. FIG. 2A illustrates a relational database 2 comprising one or more document templates 22, an option-text file 24 and a selection data file 26. Document template 22 comprises one or more text strings 28 and one or more option-text variables 30. Option-text variables 30 are the "holes" in document template 22. A document is generated from document template 22 by replacing each option-text variable 30 with a character string 34.

One embodiment of option-text data file 24 is illustrated in the table shown in FIG. 3A. Option-text data file 24 comprises option-text data records 36 in which are stored a plurality of character strings 34. Each record 36 corresponds to a specific option-text variable 30 in document template 22. Character strings 34 are strings formed from a unique option-text variable identifier 37 is used to associate a record 36 with its option-text variable 30. This permits the use of an option-text variable 30 in more than one document template 22. Each record 36 contains N cells 38 (in a typical system N=19); each cell can contain up to one character string 34. Character strings 34 are accessed via their cell address. They are not limited in length.

One embodiment of a selection data file 26 which can be used with database 2 of FIG. 2A is illustrated in the table shown in FIG. 3B. Selection data file 26 comprises a selection data record 40 associated with each option-text variable in document template 22. Each selection data record 40 is identified by a document identifier 42 and a variable identifier 37. Each record 40 stores a pointer 46 to a cell 38 of the option-text record 36 associated with the variable identifier 37. The pointers 46 provide access to character strings selected from option-text data records 36 during creation of a document.

In the preferred graphical environment, document generation system 1 is implemented as a menu-based document generation system which links each option-text variable 30 in a document template 22 to its associated option-text data record 36. In such an embodiment the plurality of character strings 34 stored in record 36 are displayed for user selection in the form of a menu. Each option-text variable 30 in the document template 22 points at a predetermined menu. During document processing, each option-text variable 30 is evaluated. If a character string associated with the variable 30 has not been yet selected, system 1 displays the menu associated with the variable 30. The user then selects one or more of the character strings selected so that it can be used to replace that particular variable 30 in the document. A similar menuing system could be implemented on an alphanumeric screen display.

The menuing approach offers some advantages in the generating of a document. The user is given all available choices and can select the appropriate choice using a pointing device 12 during document processing. When a document is generated, the one or more character strings 34 selected for each variable 30 in a document template 22 replace their respective variables 30.

The data structures defined in FIGS. 2A, 3A and 3B contain information sufficient to generate an individual document for each document template.

A second embodiment of a relational database 2 for use in a document generation system 1 will be explained in connection with FIGS. 2B, 4A and 4B. FIG. 2B illustrates a relational database 2 comprising one or more document templates 48, an option-text data file 24, a patient data file 150 and a selection data file 152. Document template 48 comprises one or more text strings 28, one or more option-text variables 30 and one or more subject matter variables 154. A document 156 (shown in FIG. 16) is generated from document template 48 by replacing each option-text variable 30 with a character string from option-text data file 24 and replacing each subject matter variable 154 with a character string 158 from patient data file 150.

In one embodiment of the document generation system 1 of FIG. 2B, option-text data file 24 is structured as in FIG. 4A. In that embodiment, a separate patient data file 150 is created. That patient data file 150 is illustrated in the table shown in FIG. 4A. Patient data file 150 comprises patient data records 160 in which are stored a plurality of character strings 158. Each record 160 corresponds to a specific subject matter variable 154 in document template 48. A unique subject matter variable identifier 162 is used to associate a record 160 with its subject matter variable 154. This permits the use of a subject matter variable 154 in more than one document template 48. As in option-text data file 24, character strings 158 of patient data records 160 are accessed via their cell address.

One embodiment of a selection data file 152 which can be used with database 2 of FIG. 2B is illustrated in the table shown in FIG. 4B. Selection data file 152 comprises a selection data record 40 associated with each subject matter variable 154 in document template 48. Each selection data record 164 is identified by a document identifier 166, a variable identifier 163 and a subject matter identifier 162. Each record 164 stores a selection indicator 170 which points to either a cell within either option-text data record 36 or patient data record 160, depending of the type of variable. Variable identifier 163 may point either to an option-text data record 36 (OVT[x]) or to a patient data record 160 (PV[y]) depending on the type of variable being replaced.

Patient data file 150 contains information about specific patients. The patient data information may include specific information about a particular patient such as name, address, etc. Patient data records 160 provide a mechanism for storing patient information in a central location accessible to different document templates 48 and even to different users. It should be obvious that a data structure similar to patient data file 150 can be implemented for any subject matter which would benefit from a central storage approach.

The data structures of FIGS. 2B, 4A and 4B contain information sufficient to generate individual documents identified by patient and document type. In an alternate embodiment, documents generated from the same document template 48 for the same patient or subject matter can be differentiated by adding a date entry to the selection data records 64 in selection data file 52.

A third embodiment of a relational database 2 for use in a document generation system 1 will be explained in connection with FIGS. 2C, 5A and 5B. FIG. 2C illustrates a relational database 2 comprising one or more document templates 48, an option-text data file 24, a patient data file 150, an option-text note data file 180, a report log 182, a date stamp function 184 and a selection data file 186. The embodiment shown in FIG. 2c adds two additional data structures (option-text note data file 180 and report log 182) to those structures defined in FIG. 2b. In addition, FIG. 2c adds a date stamp function 184 that permits the identification of records by date and time.

In one embodiment of the document generation system 1 of FIG. 2C, option-text data file 24 is structured as in FIG. 3A and patient data file 150 is structured as in FIG. 4A. In that embodiment, a separate option-text note data file 180 and a separate report log 182 are created.

In one embodiment (not shown), option-text note data file 180 comprises option-text note data records 191 in which are stored a single user-defined text note character string. Each record 191 corresponds to a specific option-text variable 30, a specific patient, a specific document template 48 and a specific date. To do this, each option-text note data record comprises an option-text variable identifier 37, a subject matter identifier 162, a document identifier 166 and a text note date entry 195.

The means for forming an option-text note must be part of option-text record 36. In the preferred embodiment, a special option-text note option function is placed in one of the cells 38 of record 36. During document processing, option function is displayed along with the other entries of record 36. When function is selected a window opens for free text entry of the option-text note.

In the above embodiment, option-text note processing can be designed such that, when a user chooses to enter an option-text note character string, a screen is displayed so that string can be entered by the user. The length of the character string entered is then measured. If the length of the option-text note character string is below a threshold, the string is stored directly in selection data file 186. If the length of the string is at or above the threshold, the string is stored in option-text note data record 191.

One embodiment of a report log 182 is illustrated in the table shown in FIG. 5a. Report log 182 comprises one or more report log records 198 in which are stored a record of the date a report was created and the patient for whom the report was created. Each report log record comprises a document identifier 166, a patient identifier 162 and a date entry 196. Report logs permit the user to maintain reports for the same patient generated from the same template.

One embodiment of a selection data file 186 which can be used with database 2 of FIG. 2C is illustrated in the table shown in FIG. 5B. Selection data file 186 comprises a selection data record 192 associated with each subject matter variable 154 in document template 48. Each selection data record 192 is identified by a document identifier 166, a variable identifier 163, a subject matter identifier 162 and a date entry 196. Each record 192 stores a selection indicator 194 which points to either a cell 38 of the option-text data record 36 associated with variable identifier 163 or a cell 161 of the patient data record 160 associated with the variable identifier 163 and subject matter identifier 168. Variable identifier 163 may point either to an option-text data record 36 (OVT[x]) or to a patient data record 160 (PV[y]) depending on the type of variable being replaced.

The data structures of FIG. 2c contain information sufficient to generate individual documents identified by patient, document type and the date the document was created.

An alternate embodiment of the option-text data file 24 shown in FIGS. 2a-2c is described in connection with the tabular illustration of an option-text data file 200 shown in FIG. 6. Option-text data file 200 adds a branching function to data file 24. Option-text data file 200 comprises option-text data records 202 in which are stored a plurality of character strings 34. Each record 202 corresponds to a specific option-text variable 30 in document template 22 or 48. A unique option-text variable identifier 204 is used to link a record 202 with its associated option-text variable 30. This permits the use of an option-text variable 30 in more than one document template 22 or 48.

In the embodiment shown in FIG. 6, each record 202 comprises N string cells 205 (in a typical system N=19) and N branching option cells 206. Each string cell 205 can contain up to one character string 34 and, like the embodiment shown in FIG. 3a, character strings 34 are accessed via their cell address and are not limited in length. In addition, each string cell is associated with a separate branching cell (in the example shown in FIG. 6, B[1] is the branching cell for S[1], B[2] is the branching cell for S[2], and so on).

In operation, (looking at FIG. 6) when a document creator wishes to offer a branch on a particular character string 34, he or she edits option-text data record 202 and associates that character string 34 with a second option-text identifier 204. (For example, to associate an identifier 204 with a character string stored in cell S[2], store identifier 204 in cell B[2].) When a user processes a document template containing the option-text variable 30 associated with that record 202, data processing device 16 displays the character strings S[1−N] contained in record 202. If the user selects the character string stored in S[2], the system branches so that the variable 30 associated with the second option-text identifier 204 can be evaluated. The character string selected during the second variable evaluation is then appended to the branching character string. In the previous example, the selected character string would be appended to the character string stored in S[2].

Figure 7A:
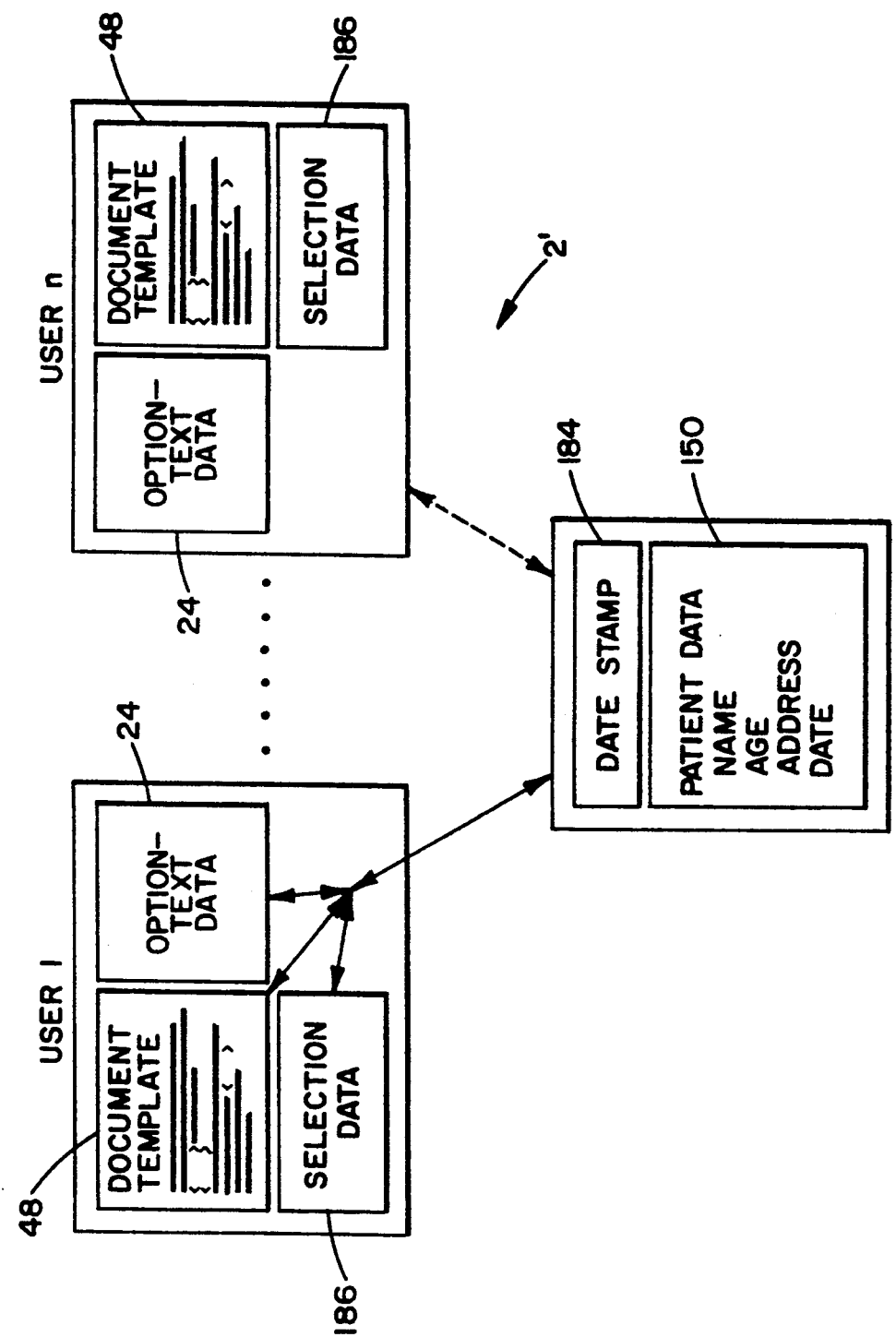
FIGS. 7a and 7b are general block diagrams of embodiments of relational databases used in multi-user document generation systems according to the present invention.

In yet another embodiment, a multi-user system partitions relational database 2 into a plurality of parts. Typical databases 2' for a multi-user system are shown generally in FIGS. 7a and 7b. The embodiments shown in FIGS. 7a and 7b are described in connection with selected data structures of FIG. 2c.

Relational database 2' comprises user-specific document templates 48, option-text data records 36 and selection data records 192. In the example given in FIG. 7a, information in patient data file 150 is stored such that more than one user can access patient information. In addition, a date stamp function 184 may be placed such that it is accessible to many users. In such an embodiment, each user may have access to the shared information in patient data file 150 for use in generating user-specific documents 210 and may define specific document templates 48 incorporating available data in a manner which seems appropriate for the particular document 210 desired. For instance, such a multi-user system might be used in a hospital or clinic wherein a variety of different types of physicians are using document generation system 1. An orthopedic surgeon and a gynecologist probably would not want to have the same document template 48 for describing an office visit; however, both physicians may need to incorporate specific patient data including name, age, address, date of birth and insurance provider into a particular report document. Significant cost savings and efficiency can be achieved by sharing this information between various individuals utilizing document generation system 1. At the same time, it is typically necessary to provide flexibility within the document generation system 1 to allow custom documents or reports to be generated for a particular situation. As a result, relational database 2' preferably is partitioned into user-specific data and sharable data. Such a configuration can be utilized across a local area network comprising a plurality of computing devices 10 connected to a relational database 2' which has user-specific and sharable portions of data.

Figure 7B:
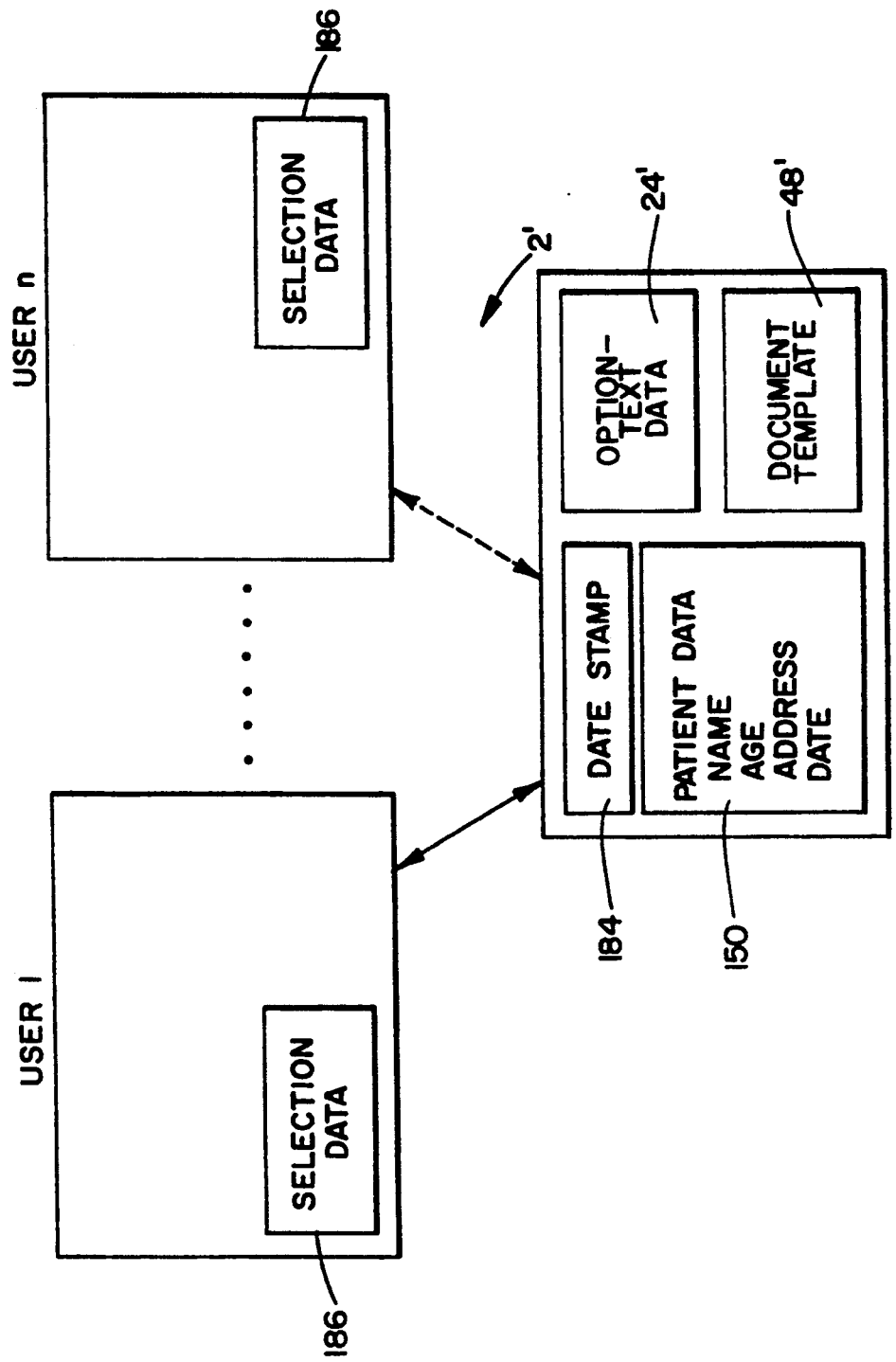

In an alternate embodiment of a multi-user relational database 2', as is illustrated generally in FIG. 7b, sharable data coverage has been expanded to include option-text data file 24' and document templates 48'. Such a system would permit flexible sharing of document templates 48' and their associated option-text data records 36'.

In yet another alternate embodiment of multi-user relational database 2' (not shown), a system could be constructed in which each user has a private option-text file and a private document template file. Each user would also have access to a public option-text file and a public document template file. Such a system would provide a balance between access to user-specific document templates and templates for generating general usage documents.

The computing device 10, in combination with the multi-document word processor 6 and relational database 2, provides a user interface for utilizing the document templates 22 and 48 to generate a document. The multi-document word processor 6 provides an editing environment for making user modifications to the text strings 28, to the character strings 34 of option-text data records 36 and to the character strings 158 of patient data records 160. Interaction of the electronic display 14, data processing device 16 and keyboard 18 provide a selecting function for selecting at least one character string 34 from the plurality of character strings 34 associated with a particular option-text variable 30. This selecting function may be accomplished by depressing key actuators on keyboard 18. In an alternative embodiment, movement of a pointing device 12 in combination with electronic display 14 accomplish the selecting function. Similar interaction provides a selecting function for selecting at least one character string 158 from the plurality of character strings 158 associated with a subject matter variable 154.

The elements of the user interface further combine to provide a document generation function which generates a document in which variables 30 and 154 are replaced by character strings obtained from pointer information stored in selection data records 40, 164 or 192.

Security access to stored data preferably is provided by the document generation system 1. Security access may be provided by distinguishing between each user's data and reports through the use of a user name. In the preferred embodiment, the user name is comprised of the first and last name of a user followed by an optional security password. The first and last name are combined to form a pointer to a storage location within relational database 2 which can typically be accessed by a user only after entering his or her first and last name as well as a security password.

The preferred embodiment document generation system 1 further includes a contextual help function in which operating instructions for use of the document generation system 1 can be displayed on electronic display 14 or printed to printer device 8.

Figure 8:
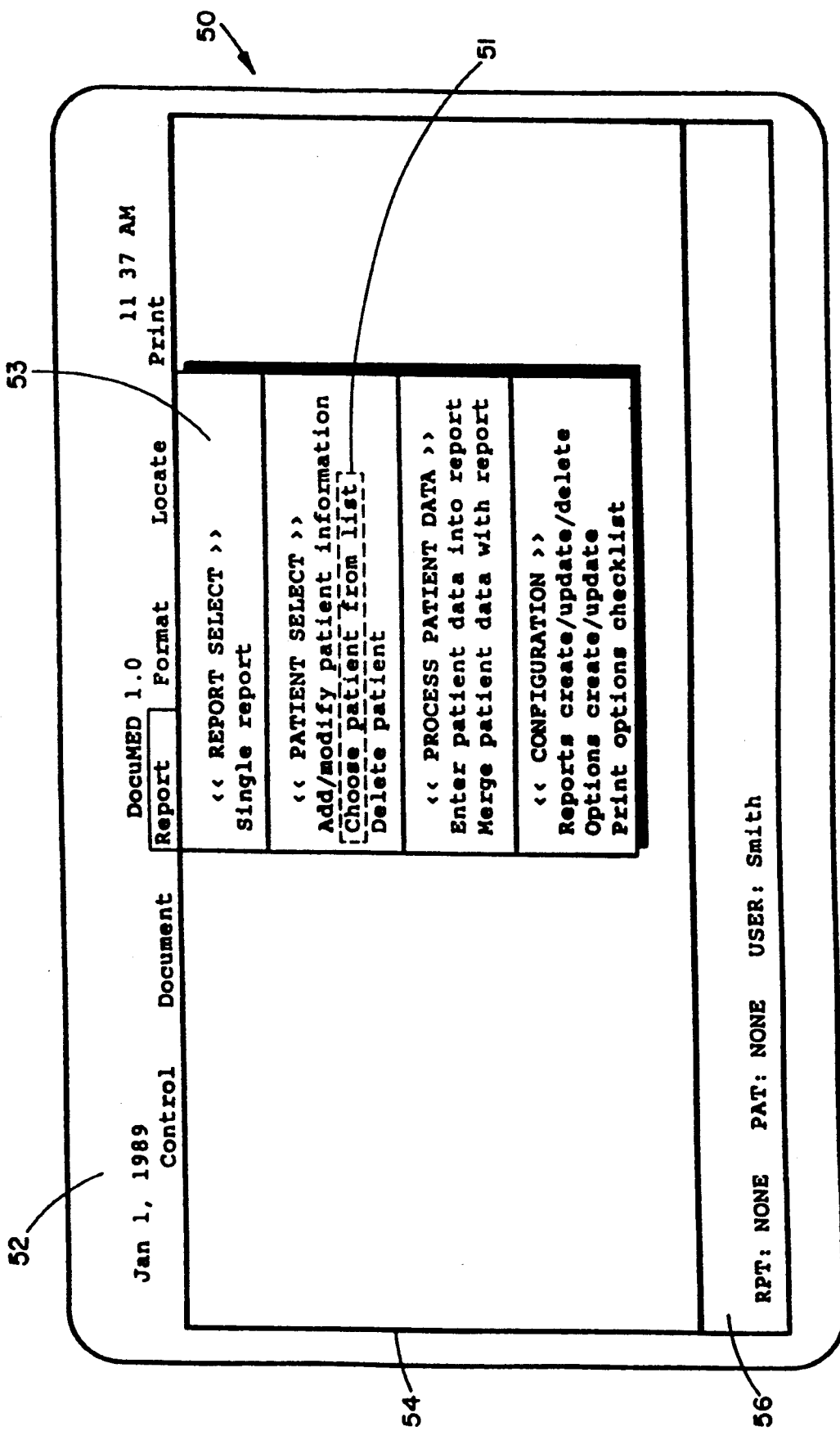
FIG. 8 is a drawing depicting a preferred embodiment menu driven, graphical window environment.

FIG. 8 is a drawing depicting a preferred embodiment menu-driven, graphical windowing environment. This windowing environment of document generation system 1 supports both text and graphics operation modes. A user can choose between the two different modes of operation. In either mode of operation, the appearance and functionality of the document generation system remains substantially consistent. The only limitation is that the use of an alternative embodiment graphics engine typically is not available in text mode operation.

The preferred graphics window environment 50 is divided into three areas. The areas include a top window section 52 which preferably displays the date, time, product name and main menu selections. Top window section 50 includes pop-up windows 53 which appear when one of the main menu selections is activated. Pop-up window 53 includes a listing of the sub-menu selections 51 associated with the activated main menu selection.

Window environment 50 further includes a middle window section 54 where documents, graphics and dialogue windows can be displayed and manipulated. The graphics window environment 50 further includes a bottom window section 56 which displays status information for such things as the word processor 6, a generated report, particular selections of report and patients, and keyboard choices.

The operation of document generation system 1 will be explained using the data structures described in connection with the multi-user system shown in FIG. 7a.

One of the first steps in using the document generation system 1 is to create a document template 48. One embodiment of a template editing window 58 for creating and editing a user-modifiable document template 48 is shown in FIG. 9. User-modifiable document template 48 comprises one or more option-text variables 30 embedded in text. (In the embodiment shown, option-text variable identifiers 37 are integers starting at 101. A unique integer is associated with each variable 30 employed by a user.)

In the preferred embodiment document generation system 1, a plurality of different documents 156, or reports, can be generated for different needs. For example, a physician will probably create a separate report for initial visits and for follow-up visits by a particular patient as well as a separate report for writing a prescription.

During the process of creating a document template 48, a user typically defines the contents of option-text data records 36 associated with each option-text variable used. FIG. 10 is a drawing showing one embodiment of an option-text record editing window 60 used for entering and editing character strings 34 in a data record 36. In the embodiment shown in FIG. 10, window 60 displays the contents of the option-text data record 36 being edited. A user can add, delete or modify character strings 34 within option-text record 36 through the use of word processor 6. (In the example shown in FIG. 10, character strings 62 or 64 may be selected by the user during document processing in order to insert the selected string into document template 48.) By selecting different character strings 34 within record 36, a user can customize a particular report for a particular patient corresponding to a particular office visit. For example, document template 48 can be combined with the selection of character string 62 to form a document stating "patient came in complaining of fatigue, . . . ".

In the preferred embodiment, the user interface provides combination operators which can be used to select more than one character string 34 from within an option-text data record 36. For example, if the user selects combination operator 66, the user interface will prompt the user to select two character strings 34. The selected character strings 34 will then be combined to replace the variable 30 associated with record 36 when a document is generated. In the example shown in FIG. 10, the selection of combination operator 66 followed by the selection of strings 62 and 64 would cause system 1 to replace the associated variable 30 with the phrase "fatigue and loss of appetite".

Figure 11:
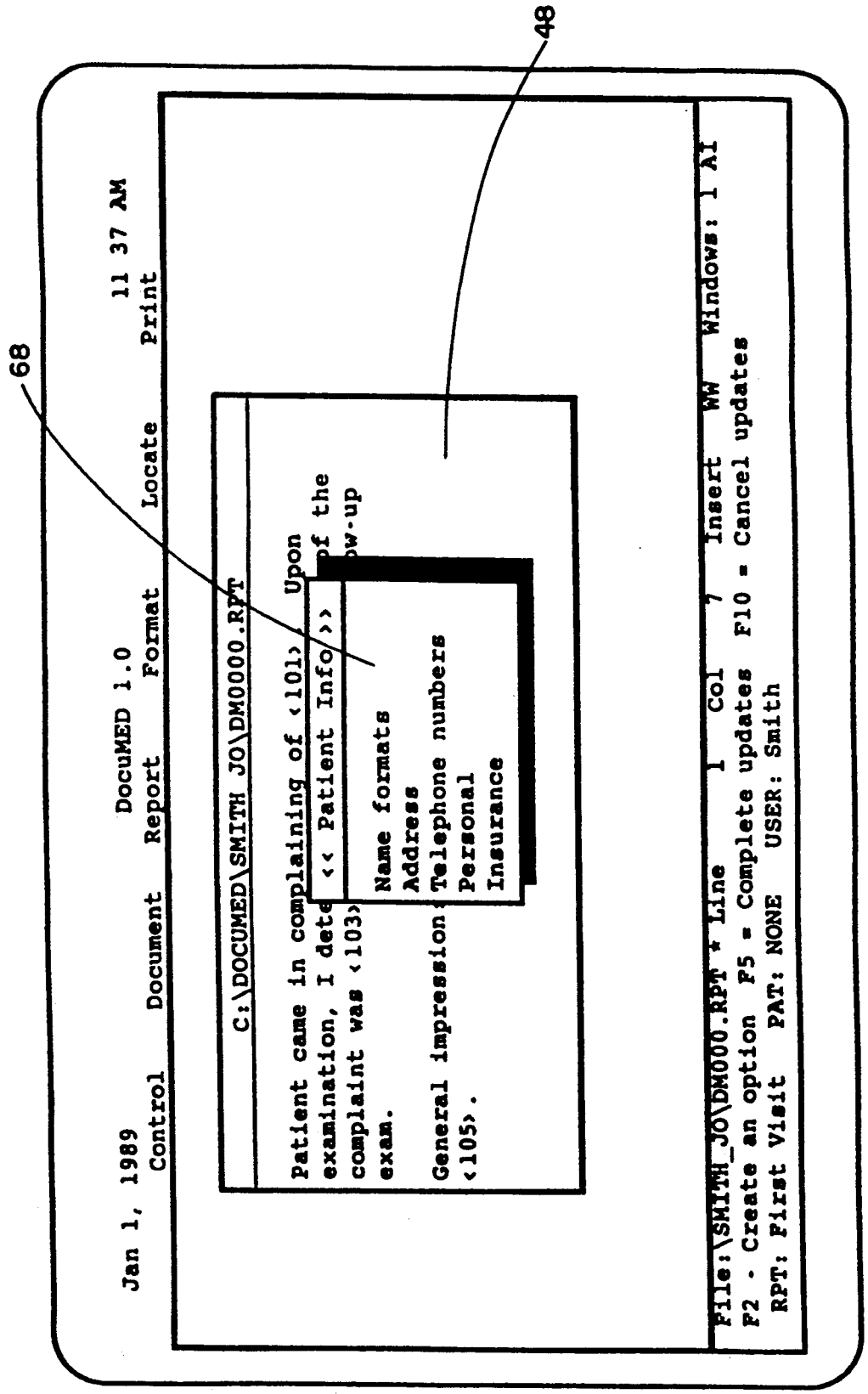
FIG. 11 is a drawing of a screen display of a patient variable selection window useful for selecting subject matter variable for use in a document template.

Another typical step in utilizing the document generation system 1 is the entering of patient data into patient data records 160 of a patient data file 150. FIG. 11 is a drawing showing one embodiment of a patient variable selection window 68 useful for selecting subject matter variables 154 to be used in a document template 48. Each subject matter variable 154 is associated with a patient data record 160 of patient data file 150.

In the preferred embodiment, patient information stored in data file 150 can be utilized by a plurality of users through the selection of particular subject matter variables 154 within window 68. Variables 154 selected are inserted into document template 48 at the point where the call to the window 68 function was initiated.

In one embodiment of the present document generation invention, patient specific information is entered into a patient data entry window 70 as shown in FIG. 12. By using patient data entry window 70, the user interface typically will prompt the user for various patient specific information such as last name, first name, middle initial, home phone and health insurance company ID number. After a user enters this information into window 70, each piece of patient information can be stored in relational database 2 in the appropriate patient data record 160. Subsequently, such information can be retrieved by all users for use in generating a document 156.

After creating suitable document templates 48 and entering patient information into patient data records 160, a user can generate a set of selection data records 186 which can be stored in selection data file 186. To create a particular set of selection data records 192, a user will first select a particular patient for which a report is to be generated. Shown in FIG. 8 is a preferred embodiment menu from which to choose the option of specifying a particular patient. A user may select the "choose patient from list" selection 51 from the sub-menu selections 51 displayed in pop-up window 53. As a result of such a selection, preferred computer device 10 will display another menu from which to choose a particular patient for generating a report. After the user selects a particular patient from the menu, the user typically will select a "single report" selection 51 within pop-up window 53 in order to designate a particular report document which is to be generated for this particular patient. Upon selecting "single report", a window including a menu of possible document templates 48 which can be used to generate a document will be shown. A user will then typically select the particular document template 48 which is to be used in conjunction with the selected patient. Subsequently, the selected document template 48 will be shown on electronic display 14 for review by user. Data processor 16 preferably will prompt the user to select particular character strings 34 within the option-text data records 36 associated with option-text variables found in the selected document template 48. An example of such a document template 48 is shown in FIG. 9, and an associated example option-text data record 36 is shown within option-text record editing window 60 of FIG. 10. Data processor 16 typically will prompt the user to select one of the character strings 62 or 64 displayed in window 60 before allowing the user to generate a report.

FIG. 13 is a drawing showing one embodiment of an option-text record selection window 74 used for selecting one of the plurality of entries in an option-text record 36. In the example shown in FIG. 13, option-text record 36 comprises two special function entries 69 and 71. When a user selects special function entry 69 from window 74, system 1 automatically replaces the variable 30 associated with record 36 with the current date. When a user selects special function entry 71, system 1 automatically generates a text entry window 73 that can be used to enter a single line of data of up to 27 characters. That line of data is then stored in the selection indicator section of the selection data record 192 associated with record 36 for subsequent use in generating a document derived from the selection data record 192.

Figure 14:
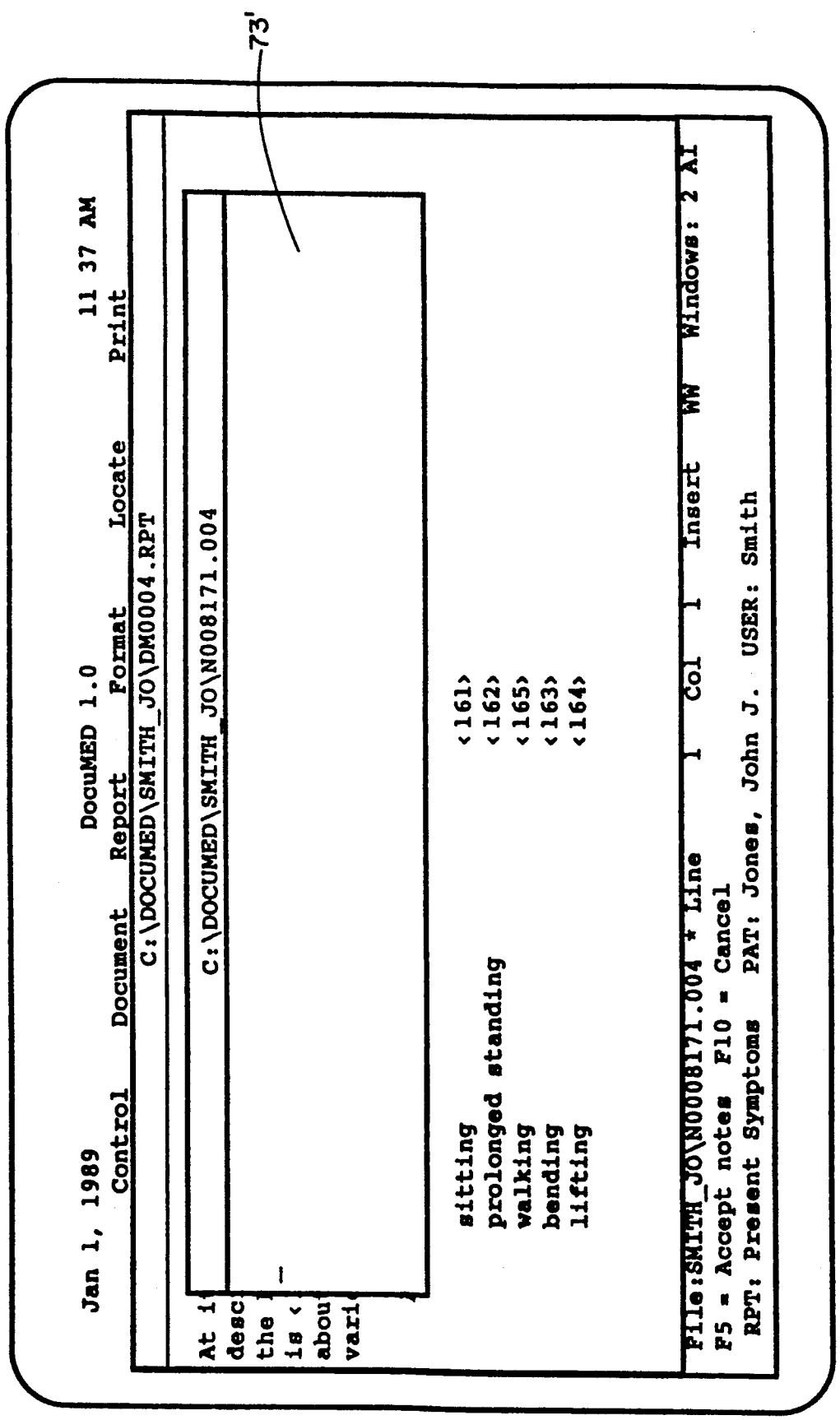
FIG. 14 is a drawing illustrative of an alternate screen display useful for entering option-text note strings for use in an option-text variable.

In another embodiment (not shown), entry 71 is replaced with an option-text note option function as described previously. When a user selects option-text note option function, system 1 automatically generates a text note entry window 73' as shown in FIG. 14 that can be used to enter up to six full pages of text. That text is then stored in option-text note data file 180 as described in the discussion accompanying FIGS. 2C, 5A and 5B. Option-text notes are useful. They provide a mechanism for the user to customize a report for a particular situation when, for example, the character strings 34 provided with data record 36 are not appropriate for a particular situation or when a user desires to add additional information into the report at that particular point.

After a user has selected replacement strings for all of the option-text variables 30 within a document template 48, he or she can electronically store the resulting selection data records 192 in electronic storage device 20.

Figure 16:
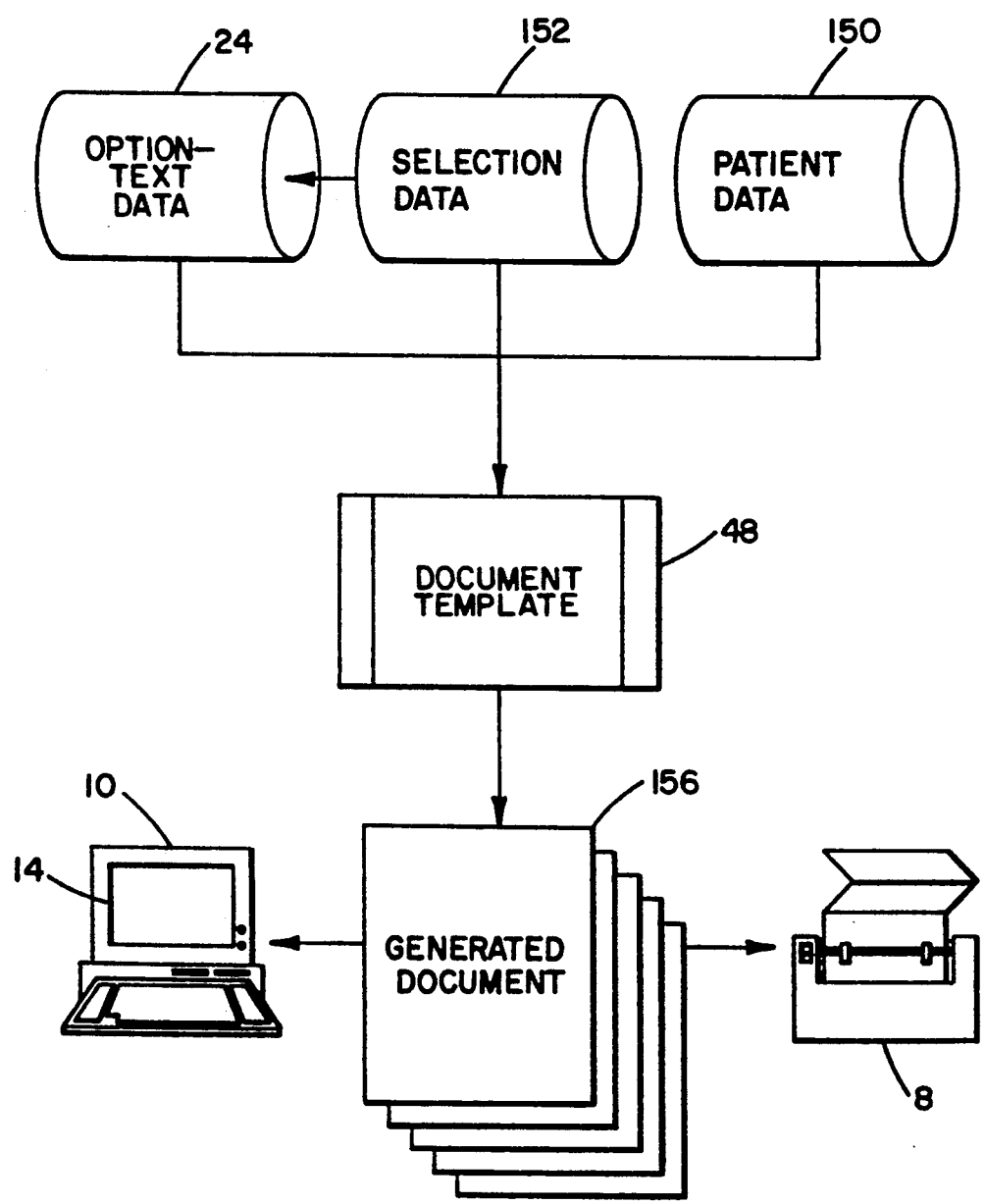
FIG. 16 is a general block diagram illustrative of the formation of a document from data stored in a document template, patient data file, option-text file and selection data file.

In addition, a user may choose to generate a document 156. Shown in FIG. 16 is a diagram showing a preferred embodiment procedure for generating a document in a system similar to that shown in FIG. 2b. A typical generated document 156 is derived from a data structure 48 in combination with option-text data file 24, selection data file 152 and patient data file 150. Data preferably is inserted into data structure 48 at the points occupied by option-text variables 30 and subject matter variables 154. In particular, option-text variables 30 are replaced with character strings from the appropriate option-text data record 36 or, if appropriate, from the option-text note associated with record 36. Subject matter variables 154 are replaced with character strings obtained from the appropriate patient data record.

After generating a document 156, document generation system 1 can display a generated document on the electronic display 14 of computing device 10 and/or output the generated document to printer 8.

Figure 15:
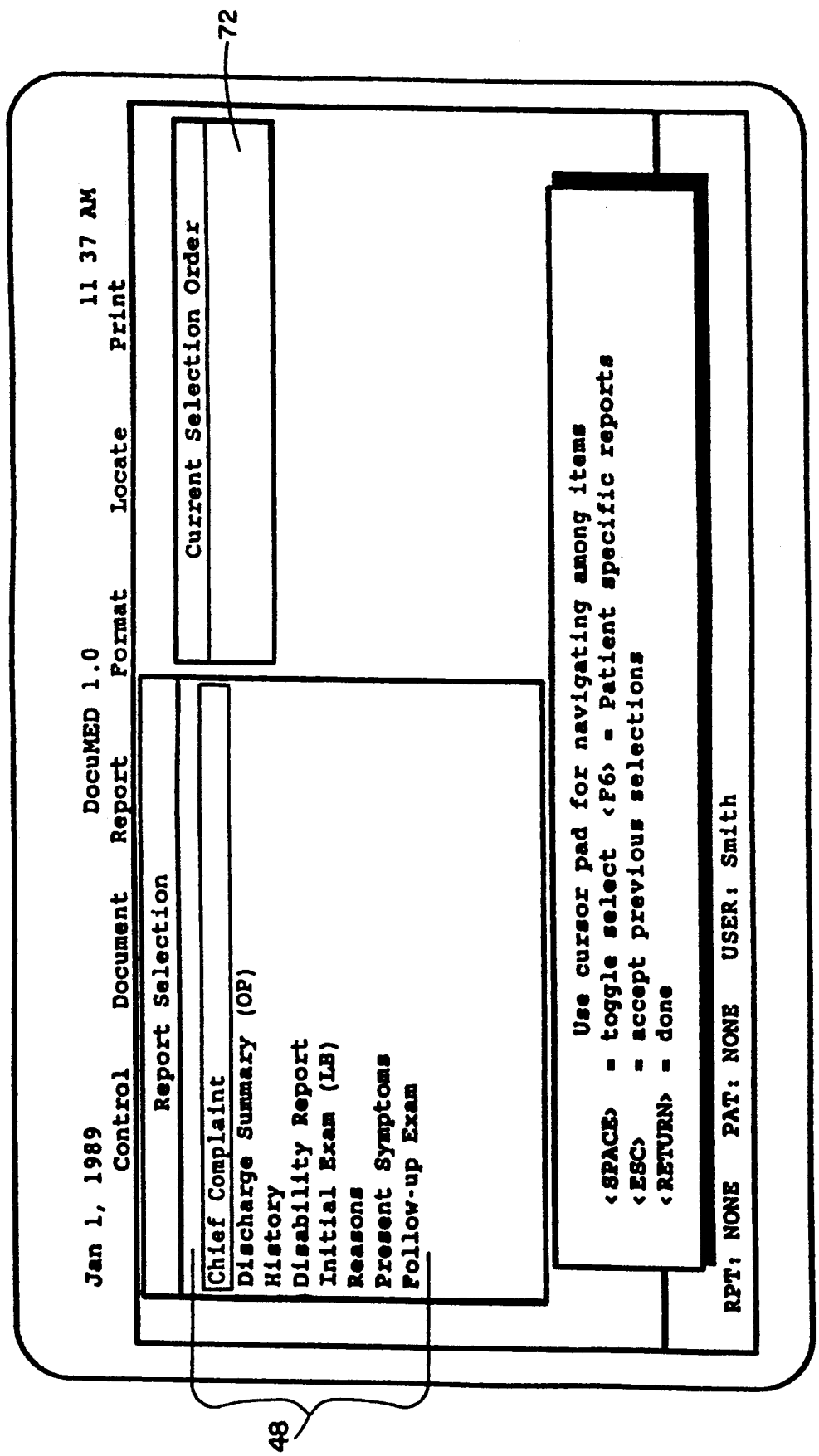
FIG. 15 is a drawing showing a screen display for one embodiment of a method for combining several previously defined document templates to form a new document template.

FIG. 15 is a drawing showing an alternative preferred embodiment example of selecting several previously defined document templates 48 to form a new document template 72. It may be desirable to generate a complete patient report including several separate reports. For instance, a complete patient report document might include a report document template 48 for "an initial visit," "lab results," and "follow-up" for ease of data entry and subsequent document generation these separate document templates 48 may be combined into a single document template 72. As a result, a plurality of different multiple document template definitions 72 may be generated for specific needs. Shown in FIG. 15, multiple document template definitions 72 normally will include several document template definitions 48. A user can define the order in which each document template 48 will appear in multiple document template definition 72. After a user has selected each of these desired document templates 22 in a particular order, a multiple document template definition 72 preferably can be stored on electronic storage device 20. Subsequently, multiple document storage definition 72 is typically selected by a user for use with a particular patient in a similar manner as was used to select a document template 48.

In an alternative embodiment, document generation system 1 can generate a checklist document including indicia of character strings 34 to be chosen within an option-text data record 36 for a particular document template 48. A printed copy of the checklist document can be utilized by a user to indicate preferred character strings 34 to be included in a generated document for a particular patient at a particular time. For example, a user might use a medical check-up checklist document to select or indicate particular information on an office visit by a patient. Such information might include measured weight of the patient during the office visit, new height or weight, symptoms of illness shown by the patient, diagnosis of an illness, and prescribed treatment of the illness. Subsequently, the same or a different user of the documentation generation system may enter the information indicated on the check sheet document to generate a report on the office visit by the patient.

As stated earlier, in one alternate embodiment, the document generation system 1 shown in FIG. 1 further comprises graphics engine 4. The graphics engine 4 is an option preferably provided within the document generation system 1 which allows visual analysis of data stored within the relational database 2, including analysis of selection data records 40, 164 or 192 and patient data records 160. Data is displayed on electronic display 14 in various forms within windows on the screen. The forms may include the following graph types:

3-D Bar
Line
Area Fill
Pie
Histogram

The graphics engine 4 allows a user to manipulate a graph in a wide variety of ways. Each data item has its own graphics definition, thereby allowing a mixture of graph types to be displayed simultaneously on the same graph. For example, a graph could contain a line of data overlaying a series of 3-D bars.

Preferred computer device 10 further includes a graphics editing mode of operation in which almost every aspect of a graph can be modified by user, including graph type, color, style, hatching, exploded pie pieces, x-axis and y-axis value ranges as well as number of points. In such an embodiment, the definition of the graph typically is stored by the electronic storage device 20 as an option-graphic image definition.

Preferred document template 48 further comprises an option-graphic variable for electronically storing a plurality of user-definable option-graphic image definitions. Such a computer device 10 typically further includes a selection function for selecting an option-graphic image definition within an option-graphic record associated with the option-graphic field. Subsequently, a document may be generated comprising the selected option-graphic image definition.

The document generation system 1 further preferably includes an analysis mode of operation in which data processor 16 can analyze electronically stored indicia of documents to produce graphs, tables or patient billing reports. Such analysis may include analysis of types of procedures performed and the results obtained. Analysis programs can sort on the selection indicators in selection data records to produce charts comparing the type of procedure and its result to other procedures. In addition, practice trends can be easily analyzed.

In another embodiment, patient billing reports may be based upon selections made within option-text records 36 within one or more document templates 48 related to a particular patient. For example, a bill could be generated for an office visit by analyzing the time spent with the patient indicated by a selection within an option-text field as well as the diagnosis made and the treatment prescribed. In addition, a brief description of the services provided could be incorporated into the billing document by deriving particular information from the electronic analysis of the selection data corresponding to a particular patient.

Although the present invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the present invention as claimed. For example, the document generation system could be utilized by other professionals such as attorney's, accountants, psychologists, dentists and consultants. Each of these professionals may find significant cost savings and increased efficiency by utilizing a document generation system similar to the previously described preferred embodiments.

What is claimed is:

1. A computer-assisted documentation system for enhancing or replacing the process of dictating and transcribing in the generation of a document, comprising:

means for providing a plurality of document templates including a first document template, wherein each document template comprises text and one or more option-text variables embedded in the text and wherein the one or more option-text variables includes a first option-text variable;

option-text variable replacement means for obtaining a first character string to be used to replace the first option-text variable within the first document template, the option-text variable replacement means comprising:

option-text storage means for storing a plurality of character strings, including the first character string, which can be used to replace the first option-text variable within the first document template, wherein the option-text storage means comprises means for storing an option-text record associated with the first option-text variable in the first document template and wherein the option-text record comprises:

a record identifier; and a plurality of character strings;

document processing means for processing the first document template, the document processing means comprising:

user interface means for displaying the plurality of character strings which comprise the option-text record associated with the first option-text variable in the first document template;

string selection means for selecting, to replace the first option-text variable, one of the plurality of character strings displayed; and recording means for recording a pointer indicative of the character string selected; and document generating means for generating a document from the first document template by replacing the first option-text variable with the selected character string.

2. The computer-assisted documentation system according to claim 1 wherein the plurality of document templates further includes a second document template and wherein the first and second templates further comprise a shared option-text variable.

3. The computer-assisted documentation system according to claim 2, wherein the means for storing a record comprises means for differentiating between a record associated with the shared option-text variable in the first document and a record associated with the shared option-text variable in the second document.

4. The computer-assisted documentation system according to claim 1 wherein:

the option-text variable replacement means further comprises option-text note storage means for storing a user-entered character string which can be used to replace the first option-text variable in the first document template, the option-text note storage means comprising means for storing an option-text note record associated with the first option-text variable, wherein the option-text note record comprises:

an option-text note record identifier associated with the first option-text variable;

a document template identifier associated with the first document template; and the user-entered character string; and the string selection means comprises means for indicating that the user-entered character string should be used to replace the first option-text variable in a document generated from the first document template.

5. The computer-assisted documentation system according to claim 1 wherein:

the option-text variable replacement means further comprises report logging means for storing a date entry representative of the date the document was generated from the first document template, the report logging means comprising means for storing a report log record associated with the first document template, wherein the report log record comprises the date entry and the document identifier associated with the first document template.

6. The computer-assisted documentation system according to claim 1 wherein:

the means for providing the first document template comprises means for providing the first document template with a subject matter variable; and the option-text variable replacement means further comprises subject matter storage means for storing subject matter character strings which can be used to replace subject matter variables in one or more of the plurality of document templates and subject matter associative means for associating subject matter variables with one of a plurality of subject matters, wherein the subject matter storage means comprises means for storing a plurality of subject matter records associated with the plurality of subject matters and wherein each subject matter record comprises:
- a subject matter identifier associated with one of the plurality of subject matters; and
- a subject matter character string associated with the subject matter variable;

whereby the subject matter character string associated with a particular subject matter can be used to replace the subject matter variable while generating the document from the first document template.

7. The computer-assisted documentation system according to claim 6 wherein:
- the plurality of subject matters includes a first subject matter; and
- the option-text variable replacement means further comprises option-text note storage means for storing a user-entered character string which can be used to replace the first option-text variable in the first document template, the option-text note storage means comprising means for storing an option-text note record associated with the first option-text variable, wherein the option-text note record comprises:
  - a record identifier associated with the first option-text variable;
  - a subject matter identifier associated with the first subject matter;
  - a document template identifier associated with the first document template; and
  - the user-entered character string.

whereby the user-entered character string can be used to replace the first option-text variable in the document generated, in connection with the first subject matter, from the first document template.

8. The computer-assisted documentation system according to claim 7 wherein:
- the option-text variable replacement means further comprises report logging means for storing a date entry representative of the date the document was generated from the first document template, the report logging means comprising means for storing a report log record associated with the first document template and the first subject matter, wherein the report log record comprises:
  - the date entry;
  - the subject matter identifier associated with the first subject matter; and
  - the document identifier associated with the first document template.

9. The computer-assisted documentation system according to claim 8 wherein:
- the option-text note record further comprises a note date entry;
- the selection data record further comprises a selection date entry; and
- the note and selection date entries are used to store the date stored in the report log record so that the option-text note record can be associated by date with the document generated from the first document template.

10. A computer-assisted documentation system for enhancing or replacing the process of dictating and transcribing in the generation of a document, comprising:
- means for storing a plurality of document templates including a first document template, wherein each document template comprises text and one or more option-text variables, including a first option-text variable, embedded in the text and wherein each document template is identified with a document identifier;
- a database comprising:
  - an option-text file comprising means for storing option-text records associated with each option-text variable, wherein each option-text record comprises:
    - an option-text record identifier; and
    - a plurality of character strings;
  - a selection data file comprising means for storing selection data records associated with the plurality of document templates, wherein each selection data record comprises:
    - a document identifier;
    - an option-text record identifier; and
    - a pointer to one of the plurality of character strings in the option-text record associated with the option-text record identifier;
- document processing means for processing the first document template, the document processing means comprising:
  - user interface means for displaying the plurality of character strings associated with each option-text variable in the first document template;
  - string selection means for selecting, for each option-text variable, one of the strings displayed; and
  - recording means for recording a selection data record indicative of the character string selected; and
- document generating means for generating a document from the first document template by replacing each option-text variable in the first document template with the selected character string.

11. The computer-assisted documentation system according to claim 10 wherein:
- the database further comprises an option-text note file comprising means for storing an option-text note record associated with the first option-text variable and the first document template, wherein the option-text note record comprises a character string that can be used to replace the first option-text note variable while generating the document from the first document template.

12. The computer-assisted documentation system according to claim 10 wherein:
- the database further comprises a report log file comprising means for storing a report log record associated with the first document template, wherein the report log record comprises a date representative of the date the document was generated from the first document template.

13. The computer-assisted documentation system according to claim 10 wherein:
- the database further comprises a subject matter file comprising means for storing subject matter records associated with a plurality of subject matters, wherein each subject matter record comprises:
  - a subject matter identifier; and a plurality of character strings comprising data descriptive of the particular subject matter; and each selection data record further comprises a subject matter identifier linking the selection data record to a particular subject matter.

14. The computer-assisted documentation system according to claim 13 wherein:

the database further comprises an option-text note file comprising means for storing an option-text note record associated with a first option-text variable, a first subject matter and a first document template, wherein the option-text note record comprises a character string that can be used to replace the first option-text note variable in the document generated, in connection with the first subject matter, from the first document template.

15. The computer-assisted documentation system according to claim 14 wherein:

the database further comprises a report log file comprising means for storing a report log record associated with the first document template and the first subject matter, wherein the report log record comprises a date representative of the date the document was generated, in connection with the first subject matter, from the first document template.

16. The computer-assisted documentation system according to claim 15 wherein:

the option-text note record further comprises a first date entry;

the selection data record further comprises a second date entry; and the first and second date entries comprise the date stored in the report log record such that the option-text note record can be associated by date with the document generated from the first document template.

17. A computer-based method of generating a document, comprising:

(a) providing a plurality of document templates, wherein each document template comprises text and one or more option-text variables;

(b) providing a plurality of option-text lists, wherein each option-text list is associated with a particular option-text variable and wherein each option-text list comprises a plurality of option-text segments;

(c) providing user interface means for selecting an option-text segment, the user interface means comprising:

display means for displaying each option-text list as a menu of items; and selection means for selecting one or more of the items displayed on the display means;

(d) selecting a first document template and a first subject matter identifier;

(e) displaying, on the display means, a first option-text list associated with a first option-text variable in the first document template;

(f) selecting one or more option-text segments from the first option-text list;

(g) accessing a selection data file associated with the first document template and the first subject matter identifier;

(h) storing, to the selection data file, one or more pointers, wherein each pointer is used to reference a selected option-text segment; and (i) generating a document in which the selected option-text segments are inserted into the first document template.

18. The method according to claim 17 wherein the step of generating a document comprises:

(a) retrieving the selection data file;

(b) retrieving, from within the selection data file, the one or more pointers associated with the first option-text variable;

(c) retrieving the option-text segment referenced by each pointer; and (d) replacing the first option-text variable with the option-text segments retrieved.

19. The method according to claim 17 wherein the step of providing user interface means further includes providing editing means for making user modifications to the text and the option-text segments.

20. The method according to claim 19 wherein the step of providing editing means for making user modifications to the text and the option-text segments includes providing option-text segment entry means for adding user-defined option-text segments to the plurality of option-text segments associated with the first option-text variable.

21. The method according to claim 19 wherein the step of providing editing means for making user modifications to the text and the option-text segments includes providing option-text note entry means for providing an option-text note.

22. The method of claim 17 wherein the step of providing user interface means comprises:

(a) providing printing means for printing a checklist document including indicia of each of the menu items; and (b) providing a means of indicating a preferred menu item on the checklist document.

23. A method of editing a document template for use in a computer-assisted documentation system comprising one or more document templates in which each of the one or more document templates comprises text and an option-text variable embedded in the text, the method comprising the steps of:

a) providing a database for use in accessing and manipulating data in option-text files and selection data files; wherein each option-text file comprises option-text records, including an option-text record identifier and a plurality of character strings associated with the option-text variable, and wherein each selection data file comprises a record associating one of the plurality of character strings in one of the option-text files with the associated option-text variable in a document template;

b) accessing a document template file in order to retrieve a document template;

c) entering text into the document template;

d) inserting a first option-text variable into the text, the step of inserting the first option-text variable comprising:

i) providing a text area for use in entering strings of characters associated with the first option-text variable;

ii) entering a plurality of character strings into the text area, the plurality of character strings including a first character string;

iii) storing the plurality of character strings to an option-text file associated with the first option-text variable;

e) storing the document template.

24. The method of claim 23 wherein the step of inserting a first option-text variable further comprises associating a second option-text variable with the first character string so as to create a branch selection function.

25. A method of selecting two or more character strings to be used to replace a first option-text variable in a document template, the method comprising the steps of:
   a) providing a document template comprising text and a first option-text variable embedded in the text;
   b) providing a database for accessing and manipulating data in option-text files and selection data files; wherein the database comprises a first selection data file associated with the document template and a first option-text file comprising a first option-text record associated with the first option-text variable and a second option-text record associated with a second option-text variable; wherein each of said option-text records comprises a plurality of character strings;
   c) selecting two or more character strings for association with the first option-text variable in the document template; and
   d) storing, in the first selection data file, pointers to the two or more character strings selected.

26. The method of claim 25 wherein the step of selecting two or more character strings comprises:
   displaying the plurality of character strings from the first option-text record;
   indicating that two or more character strings are to be combined into a phrase associated with the first option-text variable;
   selecting a first character string from the plurality of character strings displayed; and
   selecting a second character string from the plurality of character strings displayed.

27. The method of claim 25 wherein:
   the plurality of character strings of the first option-text record include a first character string;
   the first option-text record further comprises means for associating the second option-text variable with the first character string; and
   the step of selecting two or more character strings comprises:
   displaying the plurality of character strings from the first option-text record;
   selecting the first character string from the plurality of character strings displayed;
   displaying the plurality of character strings from the second option-text record; and
   selecting a second character string from the plurality of character strings displayed.

* * * * *

(12) EX PARTE REEXAMINATION CERTIFICATE (7904th)
United States Patent
Buchanan et al.

(10) Number: US 5,267,155 C1
(45) Certificate Issued: Dec. 7, 2010

(54) APPARATUS AND METHOD FOR COMPUTER-ASSISTED DOCUMENT GENERATION

(75) Inventors: Ken Buchanan, Eagan, MN (US); John A. Dowdle, St. Paul, MN (US)

(73) Assignee: I-Think, L.L.C., Ann Arbor, MI (US)

Reexamination Request:
No. 90/010,577, Jul. 14, 2009

Reexamination Certificate for:
Patent No.: 5,267,155
Issued: Nov. 30, 1993
Appl. No.: 07/847,292
Filed: Mar. 6, 1992

Related U.S. Application Data

(63) Continuation-in-part of application No. 07/422,139, filed on Oct. 16, 1989, now Pat. No. 5,148,366.

(51) Int. Cl.
G06F 17/27 (2006.01)
G06F 17/24 (2006.01)

(52) U.S. Cl. .......................................... 715/210
(58) Field of Classification Search .................. None
See application file for complete search history.

(56) References Cited

U.S. PATENT DOCUMENTS

| 3,872,462 A | 3/1975 | Lemelson |
| 3,934,226 A | 1/1976 | Stone et al. |
| 4,347,568 A | 8/1982 | Giguere et al. |
| 4,348,744 A | 9/1982 | White |
| 4,370,707 A | 1/1983 | Phillips et al. |
| 4,429,372 A | 1/1984 | Berry et al. |
| 4,445,795 A | 5/1984 | Levine et al. |
| 4,454,576 A | 6/1984 | McInroy et al. |
| 4,491,725 A | 1/1985 | Pritchard |
| 4,553,860 A | 11/1985 | Imaizumi et al. |
| 4,559,598 A | 12/1985 | Goldwasser et al. |
| 4,591,974 A | 5/1986 | Dornbush et al. |
| 4,608,662 A | 8/1986 | Watanabe et al. |
| 4,633,430 A | 12/1986 | Cooper |
| 4,674,040 A | 6/1987 | Barker et al. |
| 4,674,043 A | 6/1987 | Hernandez et al. |
| 4,713,754 A | 12/1987 | Agarwal et al. |
| 4,730,252 A | 3/1988 | Bradshaw |
| 4,794,386 A | 12/1988 | Bedrij et al. |
| 4,809,220 A | 2/1989 | Carlson et al. |
| 4,815,029 A | 3/1989 | Barker et al. |

(Continued)

FOREIGN PATENT DOCUMENTS

| EP | 0 216 063 A2 | 4/1987 |
| EP | 0 338 770 A2 | 10/1989 |
| JP | 02-042561 | 2/1990 |
| WO | WO 82/00726 A1 | 3/1982 |
| WO | WO 90/04227 A1 | 4/1990 |
| WO | WO 91/08538 A1 | 6/1991 |

OTHER PUBLICATIONS

Grace S. Hucko Ph.D. and W.D. Hagamen M.D., "An Interactive Patient Record System and Its Transfer from a Mainframe to Microcomputers" (1978), pp. 509–516.

Jan R. Schultz, "A History of the PROMIS Technology: An Effective Human Interface" (1988), 49 pp.

(Continued)

Primary Examiner—James Menefee

(57) ABSTRACT

A document generation system for enhancing or replacing the dictation and transcription process. More particularly, a computer-based documentation system is provided which processess document templates in conjunction with pre-defined character strings to generate user-defined reports or documents. Each document template is composed of "boiler plate" text and "holes". A system and method are described for controlling, via a relational database, the selection of pre-defined character strings to be inserted into document template "holes". A second method is described for inserting user-defined or concatenated character strings into selected document template "holes".

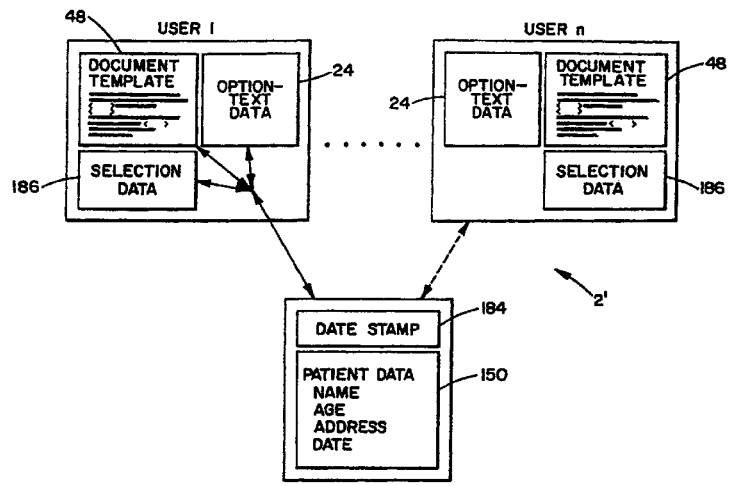

U.S. PATENT DOCUMENTS

| | | | |
|---|---|---|---|
| 4,827,462 A | 5/1989 | Flannagan et al. |
| 4,835,690 A | 5/1989 | Gangarosa et al. |
| 4,839,822 A | 6/1989 | Dormond et al. |
| 4,878,175 A | 10/1989 | Norden-Paul et al. |
| 4,939,689 A | 7/1990 | Davis et al. |
| 4,959,769 A | 9/1990 | Cooper |
| 4,962,475 A | 10/1990 | Hernandez |
| 4,991,091 A | 2/1991 | Allen |
| 5,043,891 A | 8/1991 | Goldstein et al. |
| 5,077,666 A | 12/1991 | Brimm et al. |
| 5,146,439 A | 9/1992 | Jachmann et al. |
| 5,200,893 A | 4/1993 | Ozawa et al. |
| 5,267,155 A | 11/1993 | Buchanan et al. |
| 5,290,109 A | 3/1994 | Midorikawa |
| 5,893,914 A | 4/1999 | Clapp |

OTHER PUBLICATIONS

John McLatchy et al., "The Capturing of More Detailed Medical Information in Costar;" The Seventh Annual Symposium on Computer Applications in Medical Care, Washington D.C. (Oct. 23–26, 1983), pp. 329–332.

David P. Jennings, D.V.M, Ph. D. and Mark R. Dambro, M.D., "Using a Hypercard Workstation to Interface with a Costar Data Base" The Twelfth Annual—Symposium on Computer Applications in Medical Care, Washington D.C. (Nov. 6–9, 1988), pp. 445–447.

Warner V. Slack, M.D. et al., "A Computer–Based Medical–History System," The New England Journal of Medicine (Jan. 27, 1966), pp. 194–198.

Hospital Computer Systems, ed. Morris Collen, Wiley Biomedical–Health Publication (1974), pp. 457–516.

James A. Sprowl, "The ABF Processor: Part I—Primer" (1978), 129 pp.

James A. Sprowl and Ronald W. Staudt, "Computerizing Client Services in the Law school Teaching Clinic: An experiment in Law Office Automation," American Bar Foundation (1981), pp. 699–752.

Henry Harr, "ABF: An Expert System for Office Automation and an Interpreter for Legal Document Construction" (Aug. 1987), 152 pp.

Annison Systems and IBM Corporation, "IBM SolutionPac Doctor's Office Management Book 2: Reference" (Dec. 1985), 464 pp.

Andrews, Robert D.; "Computer Charting: An Evaluation of a Respiratory Care Computer System;" Respiratory Care; vol. 30, No. 8; Aug. 1985; pp. 695–707.

Anderson, John; "King's College Hospital Computer System (London);" Hospital Computer Systems, Chapter Sixteen; 1974; pp. 457–516.

Ash, Stephen R., M.D., F.A.C.P., et al..; "Portable and Desktop Microcomputers for Patient Care Charting;" Journal of Medical Systems, vol. 10, No. 4; 1986; pp. 361–373.

Armstrong, Carl W., M.D; "AHA Guide to Computerized Physician Order–Entry Systems;" American Hospital Association; Nov. 2000; pp. 1–48.

Bana, D.S., et al.; "A Computer–Based Headache Interview: Acceptable by Patients and Physicians;" Headache; vol. 20, No. 2; Mar. 1980; pp. 85–89.

Bana, D.S., et al.; "Use of a Computerized Data Base in a Headache Clinic;" Headache; vol. 21, No. 2; Mar. 1981; pp. 72–74.

Banks, N.J., et al.; "Prompt for COSTAR—A Clinical Reminder System;" Proceedings of the Annual Symposium on Computer Applications in Medical Care; Nov. 1989; pp. 941–942.

Barnett, G. Octo M.D.; "The Application of Computer–Based Medical–Record Systems in Ambulatory Practice;" The New England Journal of Medicine, vol. 310, No. 25; Jun. 1984; pp. 1643–1650.

Barnett, G.O., et al.; "COSTAR: A Comprehensive Medical Information System for Ambulatory Care;" The Proceedings of the Annual Symposium on Computer Applications in Medical Care; Nov. 1982; pp. 8–18.

Barnett, G. Octo, M.D., et al.; "COSTAR System;" Information Systems for Patient Care, Chapter 19; 1984; pp. 270–291.

Barnett, G.O., et al.; "MUMPS: A Support for Medical Information Systems;" Informatics for Health and Social Care; vol. 1, No. 3, Sep. 1976; pp. 183–189.

Bergeron, et al.; "Intelligent Visual Input: A Graphical Method for Rapid Entry of Patient–Specific Data;" Proceedings of the Annual Symposium on Computer Application in Medical Care; Nov. 1987; pp. 281–286.

Bessen, James, et al.; "Working Paper No. 03–17 An Empirical Look at Software Patents;" Working Papers Research Department; Aug. 2003; 3 cover pages and pp. 1–36.

Blois, Marsden S., M.D., Ph.D.; "The Physician's Personal Workstation;" M.D. Computing vol. 2, No. 5; 1985; pp. 22–26.

Bloom, Saul M., et al.; "Converse: A Means to Write, Edit, Administer, and Summarize Computer–Based Dialogue;" Computers and Biomedical Research; vol. 11, No. 2; 1978; pp. 167–175.

Boyd, William E., et al.; "The A–9: A Program for Drafting Security Agreements Under Article 9 of the Uniform Commercial Code;" American Bar Foundation Research Journal; vol. 1981, Winter, No. 1; 1981; 2 cover pages, pp. 571, 637, and 639–669.

Brickman, David M., M.D. et al.; "Medical Computing, Realities for the Private Practitioner;" Information Systems for Patient Care, Chapter 27; 1984; pp. 348–353; reprinted from "The Sixth Annual Symposium on Computer Applications in Medical Care," Oct. 30–Nov. 2, 1982.

Campbell, James, et al.; "Clinic Function and Computerized Ambulatory Records: A Concurrent Study with Conventional Records;" Proceedings of the Annual Symposium on Computer Applications in Medical Care; Nov. 1988; pp. 745–748.

Cannon, Scott R., et al.; "Experience with a Computerized Interactive Protocol System Using HELP;" Computers and Biomedical Research; vol. 13, No. 5, 1980; pp. 399–409.

Chang, M.M., et al., "The Alcohol Treatment Unit Computerized Medical Record (ATU CMR): A Clinician—Entered Inpatient Record;" Proceedings of the Annual Symposium on Computer Applications in Medical Care; Nov. 9, 1988; 717–721.

Cimino, James J., M.D., et al.; "The Physician's Workstation: Recording a Physical Examination Using a Controlled Vocabulary;" Proc. Annu. Symp. Comput. Appl. Med Care; Nov. 4, 1987; pp. 287–291.

Clayton, P.D., et al.; "Data Driven Interpretation of Laboratory Results in the Context of a Medical Decision Support System;" Clinical Biochemistry Principles Methods Applications 2, Data Presentation Interpretation; Chapter 3.7; 1989; 2 cover pages and pp. 367–377.

ComputerTalk; "Directory of Medical Computer Systems;" Spring Edition 1985; 76 pages.
ComputerTalk; "Directory of Medical Computer Systems;" Spring Edition 1986; 60 pages.
ComputerTalk; "Directory of Medical Computer Systems;" Spring Edition 1987; 60 pages.
ComputerTalk; "Directory of Medical Computer Systems;" Spring Edition 1988; 68 pages.
ComputerTalk; "Directory of Medical Computer Systems;" Spring Edition 1989; 56 pages.
Cook, Gordon; "A Medical Revolution That Could . . . : The Work of the Promis Laboratory and Lawrence L. Weed, M.D.;" Sep. 1978; 24 pages.
Cristea, et al.; "Combining Menus with Natural Language Processing in Recording Medical Data;" Journal of Clinical Computing, vol. 16, Issue 5–6; 1988; pp. 156–166.
Cushing, Matthew, Jr., M.D.; "Doctor's Office Manager: An IBM Billing Package;" M.D. Computing, vol. 2, No. 3; 1985; pp. 23–30.
Cushing, Matthew, Jr., M.D.; "Medical Manager: An Update;" M.D. Computing, vol. 9, No. 1; 1992; pp. 51–53.
Cushing, Matthew, Jr., M.D.; "The Medical Manager, Version 6: An Update;" M.D. Computing, vol. 6, No. 2; 1989; pp. 94–96.
Cushing, Matthew, Jr., M.D.; "Software Review: Medical Manager, An Office Management System;" M.D. Computing, vol. 1, No. 1; 1984; pp. 31–35.
Dambro, Mark R., et al.; "Assessing the Quality of Data Entry in a Computerized Medical Records System;" Journal of Medical Systems; vol. 12, No. 3; Jun. 1988; pp. 181–187.
Dambro, Mark R., et al.; "Tracking Patients: Applications of the COSTAR System;" Arizona Medicine; vol. XLI, No. 9; Sep. 1984; pp. 617–618.
Dambro, Mark R., et al.; "An Unsuccessful Experience with Computerized Medical Records in an Academic Medical Center;" Journal of Medical Education; vol. 63; No. 8; Aug. 1988; pp. 617–623.
Datapro; "Excerpts from . . . A Datapro Feature Report—Word Processing Systems User Ratings;" undated; 8 pages.
Dictaphone; "Contract No. GS–OOC–02485;" Oct. 1, 1980–Sep. 30, 1981; 56 pages.
Dictaphone; "Contract No. GS–OOC–03429;" Oct. 1, 1982–Sep. 30, 1983; 58 pages.
Dictaphone; "Dictaphone Reports 45% Increase in its Worldwide Word Processing Sales in 1982;" Press Release: CR–001–1/83; Jan. 1983; 2 pages.
Dictaphone; "Dictaphone System 6000;" WP11–379–301 Word Processing Systems; Jul. 1983; 9 pages.
Dictaphone; "The Dictaphone System 6000;" 13 pages.
Dictaphone; "Dual Display Information Processing;" Feb. 1982; 4 pages.
Dictaphone; "Dual Display—Prompts, A Quick Reference Guide to the Dual Display;" May 1981; 71 pages.
Dictaphone; "Dual Display Information Processing System;" 5 pages.
Dictaphone; "Enhancements to System 6000 Word Processor Announced by Dictaphone;" Press Release: PR–009–6/83; Jun. 1983; 2 pages.
Dictaphone; "Legal Management System Brochure;" Feb. 1983; 7 pages.
Dictaphone; "Legal Management System Manual;" 192 pages.
Dictaphone; "System 6000—The Dictaphone Integrated Office System with Natural Language Accessibility;" Mar. 1983; 5 pages.
"Document Modeler;" The Model Office Company; 1985; 262 pages.
Dudeck, J., et al.; "The HELP—System in a European Environment;" Towards New Hospital Information Systems; 1988; 5 cover pages, pp. 105–110, and back cover.
Ehrenhaft, Pony M., et al.; "Policy Implications of Medical Information Systems;" Dec. 1977; 76 pages.
Eidelman, James A.; "The Computer as Electronic Form Book;" Legal Economics; vol. 14, No. 4; May/Jun. 1988; pp. 3 and 45–59.
Farrell, et al.; "Applying Structured Tools and Techniques to the Development of Software for a Small Computer System;" Proceedings of the 1981 ACM SIGSMALL Symposium on Small Systems and SIGMOD Workshop on Small Database Systems; 1981; pp. 1–8.
Farrel, Donald L., et al.; "Implementation of a Computer–Assisted Medical Record System in the Family Practice Office;" Hawaii Medical Journal; vol. 41, No. 3; Mar. 1982; pp. 90–93.
Fiddleman, Richard H.; "Proliferation of COSTAR—A Status Report;" Information Systems for Patient Care, Chapter 21; 1984; pp. 301–307; reprinted from The Sixth Annual Symposium on Computer Applications in Medical Care, Oct. 30–Nov. 2, 1982.
Fiddleman, Richard H.; "Who Uses COSTAR and Why;" Proceedings of the Annual Symposium on Computer Applications in Medical Care; Nov. 1981; pp. 88–90.
Forward, Daniel J., M.D.; "A Computer–Assisted Problem–Oriented Medical Record System for Office Use;" Information Systems for Patient Care, Chapter 25; 1984; pp. 330–337; reprinted from The Fifth Annual Symposium on Computer Applications in Medical Care, Nov. 1–4, 1981.
Forward, Daniel J.; "Development of a Computer–Assisted Problem–Oriented Medical Record System for Office Use;" Proceedings of the Annual Symposium on Computer Applications in Medical Care, Nov. 1981; pp. 104–110.
"Functional Specification of a PROMIS Instance System;" vols. 1 and 2; Vermont University; Dec. 1980; 703 pages.
Gardner, Reed M.; "Computerized Data Management and Decision Making in Critical Care;" Surgical Clinics of North America; vol. 65, No. 4; Aug. 1985; pp. 1041–1051.
Gerlach, R.J., et al.; "System for Simplified Form Fill–in Using CRT Display;" IBM Technical Disclosure Bulletin, vol. 21, No. 11; Apr. 1979; pp. 4323–4329.
Glaser, John P., et al.; "A Very Large PC LAN as the Basis for a Hospital Information System;" Journal of Medical Systems, vol. 15, No. 2; Apr. 1991; pp. 133–137.
Gould, et al.; "Composing Letters with a Stimulated Listening Typewriter;" Communications of the ACM; vol. 26; No. 4; Apr. 1983; pp. 295–308.
Haessler, Herbert A., et al., "Evolution of an Automated Database History;" Archives of Internal Medicine; vol. 134; Sep. 1974; pp. 586–591.
Hagamen, W., et al., "Medical Applications of Data–Driven APL Programs;" Proceedings of Seventh International Conference on APL, 1975; pp. 158–165.
Hagamen, W. et. al., "A Program Generator;" IBM Systems Journal; vol. 14, No. 2; 1975; 2 cover pages and pp. 102–133.

Hammond, Kendric W., et al.; "A Computerized Psychiatric Treatment Planning System;" Hospital and Community Psychiatry; vol. 35, No. 2; Feb. 1984; pp. 160–163.

Hammond, Kendric W., et al.; "GRAMPS: An Automated Ambulatory Geriatric Record;"Proceedings of the Annual Symposium on Computer Applications in Medical Care; Nov. 1988; pp. 708–712.

Hammond, W. E., Ph.D, et al.; "Data Base Management System for Ambulatory Care;" Information Systems for Patient Care, Chapter 15; 1984; pp. 218–231; reprinted from The First Annual Symposium on Computer Applications in Medical Care, Oct. 3–5, 1977.

Hammond, W. et al.; "The Evolution of a Computerized Medical Information System;" Duke University Medical Center; 1986; pp. 147–156.

Hammond, Kendric W., et al.; "A Provider—Interactive Medical Record System Can Favorably Influence Costs and Quality of Medical Care;" Computers in Biology and Medicine; vol. 20, No. 4; 1990; pp. 267–279.

Hammond, W. et al.; "Standards in Medical Informatics;" Medical Informatics Computer Applications in Health Care and Biomedicine; Chapter 6 in EH Shortliffe, LE Perreault, G Wiederhold, LM Fagan, eds. Medical Informatics: Computer Applications in Health Care and Biomedicine. New York: Springer, pp. 226–276; 2000.

Hammond, Kenric W., et al; "Structured Integration of Narrative Medical Data Bases;" Mug Quarterly; vol. XIX, No. I; 1989; pp. 49–54.

Hammond, Kenric W., et al; "Structured Text Management in an Outpatient Medical Record System;" Proceedings of the American Association for Medical Systems and Informatics; AAMSI Congress, vol. 5; May 14, 1987, 2 cover pages and pp. 73–77.

Haug, Peter J., et al.; "A Decision–Driven System to Collect the Patient History;" Computers and Biomedical Research; vol. 20, No. 2; Apr. 1987; pp. 193 and 195–207.

Humphreys, Betsy L., et al.; "Building the Unified Medical Language System;" Proceedings of the Thirteenth Annual Symposium on Computer Applications in Medical Care; IEEE Computer Society Press; 1989; pp. 475–480.

Jelovsek, Frederick R., M.D., et al.; "Impact of an On–Line Information System in the Medical Office;" Information Systems for Patient Care, Chapter 24; pp. 322–329; reprinted from The Sixth Annual Symposium on Computer Applications in Medical Care, Oct. 30–Nov. 2, 1982.

Jordan, et al.; "English Output of the Physical Examination in an Automated Medical Record;" Proceedings of the 1975 ACM Annual Conference; 1975; pp. 59–63.

Kerlin, Barbara D. Ph.D.; "User Satisfaction with COSTAR V;" Information Systems for Patient Care, Chapter 20, 1984; pp. 293–300; reprinted from The Third Annual Symposium on Computer Applications in Medical Care, Oct. 14–17, 1979.

Korpman, Ralph A., MD; "Patient Care Information Systems: Looking to the Future, Part 5. The Integrated Information System;" *Software In Health Care;* 1985; 7 pages.

Kuhn, Ingeborg M., Ph.D, et al.; "Automated Ambulatory Medical Record Systems in the US;" Information Systems for Patient Care, Chapter 14; 1984; 3 cover sheets and pp. 199–217.

Kukich, Karen; "Knowledge–Based Report Generation: A Technique for Automatically Generating Natural Language Reports from Databases;" Proceedings of the 6th annual international ACM SIGIR conference on Research and Development in Information Retrieval; Session 11: Numerical Databases; 1983; pp. 246–250.

Kuperman, Gilad J., et al.; "The HELP System A Snapshot in Time;" Department of Biophysics, LDS Hospital, Salt Lake City, Utah, Sep. 1988; 302 pages.

Larimer, Emily; "Document Maker—Text Management Software for the Mac;" Office Equipment & Methods; May 1986; cover page and pp. 50, 51, and 54.

Lee, Alison, et al.; "Officeaid: An Integrated Document Management System;" Proceedings of the Second ACM–SIGOA Conference on Office Information Systems; Jun. 1984; pp. 170–180.

Locke, S.E., et al.; "Computer–Based Interview for Screening Blood Donors for Risk of HIV Transmission;" Proceedings of the Annual Symposium on Computer Applications in Medical Care; Nov. 1990; pp. 835–839.

Lodwick, Gwilym S.; "Information Management in Radiology;" Hospital Computer Systems; Chapter 9; 1974; pp. 206–240.

Ma, H.–N.N., et al; "An Intelligent Progress Note System for Medas (A Bayesian Medical Expert System);" Proceedings of the Third Annual IEEE Symposium on Computer–Based Medical Systems; Jun. 1990; pp. 484–491.

Malone, Thomas W., et al.; "The Information Lens: An Intelligent System for Information Sharing in Organizations;" Proceedings of the SIGCHI Conference on Human Factors in Computing Systems; Apr. 1986; pp. 1–8.

Malone, Thomas W., et al.; "Intelligent Information–Sharing Systems;" Communications of the ACM; vol. 30, No. 5; May 1987; pp. 390–402.

Malone, Thomas W., et al.; "Semistructured Messages Are Surprisingly Useful for Computer–Supported Coordination;" ACM Transactions on Office Information Systems; vol. 5, No. 2; Apr. 1987; pp. 115–131.

Margolis, Alvaro, et al.; "New Uses of Legacy Systems: Examples in Perinatal Care;" Proceedings of the AMIA Annual Symposium; 1999; pp. 854–858.

Massey, James, et al.; "A PC–Based Free Text Retrieval System for Health Care Providers;" Journal of Medical Systems; vol. 11, No. 1; 1987; pp. 69–81.

Maultsby, Maxie C., et al.; "A Computer–Based Psychiatry History System;" Archives of General Psychiatry; vol. 25, Issue 6; Dec. 1971; pp. 570–572.

McColligan, Elizabeth E. M. S., M.P.H.; "Core Record System," Information Systems for Patient Care, Chapter 18; 1984; pp. 260–269.

McDonald, C.J., et al.; "The Benefits of Automated Medical Record Systems for Ambulatory Care;" Proceedings of the Tenth Annual Symposium on Computer Applications in Medical Care; Oct. 1986; cover page and pp. 157–171.

McDonald, Clement J. M.D.; "Computer–Stored Medical Record Systems;" Editorial, M.D. Computing vol. 5, No. 5; 1988; pp. 3–5.

McDonald, Clement J., M.D., et al.; "Data Base Management, Feedback Control and The Regenstrief Medical Record;" Proceedings of the Annual Symposium on Computer Applications in Medical Care; Nov. 1982; pp. 52–60.

McDonald, Clement J., M.D., et al.; "The Medical Gopher—A Microcomputer System to Help Find, Organize and Decide About Patient Data;" West J. Med. 145(6), Dec. 1986; pp. 823–829.

McDonald, Clement J., M.D., et al.; "Physicians, Information Technology, and Health Care Systems: A Journey, Not a Destination;" Journal of the American Medical Informatics Association; vol. 11, No. 2; Mar./Apr. 2004; pp. 121–124.

McDonald, Clement J. M.D., et al.; "Regenstrief Medical Record System;" Information Systems for Patient Care, Chapter 16; 1984; pp. 232–248; reprinted from Journal of Medical Systems, 7, 1983.

McDonald, Clement J., M.D., et al.; "The Regenstrief Medical Records;" M.D. Computing vol. 5, No. 5; 1988; pp. 34–47.

McDonald, Clement J., M.D., et al.; "The Regenstrief Medical Record: 1989 A Campus–Wide System;" Proceedings of the Annual Symposium on Computer Applications in Medical Care; Nov. 1989; pp. 933–936.

McDonald, M. D., Clement J., et al.; "The Regenstrief Medical Record System: a quarter century experience;" International Journal of Medical Informatics, vol. 54; 1999; pp. 225–253.

McDonald, M. D., Clement J., et al.; "The Regenstrief Medical Record System 1999: Sharing Data Between Hospitals;" 1999; 1 page.

McEachron, Donald L., et al.; "Image Processing for the Rest of Us: The Potential Utility of Inexpensive Computerized Image Analysis in Clinical Pathology and Radiology;" Computerized Medical Imaging and Graphics, vol. 13, No. 1; 1989; pp. 3–30.

McLeod, Dennis J., et al.; "SELECT: An Interactive Minicomputer Subsystem for the Generation of Specialized Narrative Text;" Computers and Biomedical Research; vol. 10; 1977; pp. 91–99.

Medical Documenting Systems; "User's Guide to Documed;" DocuMed Version 1.0; 1989; 103 pages.

Medical Documenting Systems; "DocuMed User's Guide;" DocuMed Version 2.0; 1990; 240 pages.

Medical Records; Online Lecture Notes for MDIF G4001 Introduction to Medical Informatics at Coumbia University; http://www.dbmi.columbia.edu/hripcsak/textbook/records.txt; Sep. 1997; 4 pages.

Molich, Rolf, et al.; "Improving a Human–Computer Dialogue;" Communications of the ACM, vol. 33, No. 3; Mar. 1990; pp. 338–348.

Mowry, Mychelle, et al.; "Evaluating Automated Information Systems;" Nursing Economics, vol. 5, No. 1; Jan./Feb. 1987; pp. 7–12.

Murchie, C. Joyce, et al.; "Comparison of Keyboard, Light Pen and Voice Recognition as Methods of Data Input;" International Journal of Clinical Monitoring and Computing; vol. 5, No. 4; Dec. 1988; pp. 243–246.

Murphy, Shawn N., MD, Ph.D, et al.; "Optimizing Healthcare Research Data Warehouse Design through Past COSTAR Query Analysis;" Proc AMIA Symp.; 1999; 892–896 (5 pages).

Naeymirad, Shon Afshin; "The Portable Patient File: An Intelligent Automated Medical Record;" Submitted in Patial Fulfillment of the Requirements for the Degree of Master of Science in Computer Science in the Lewis College of Science and Letters of Illinois Institute of Technology; Dec. 1988; 4 cover pages and pp. 1–41.

Naeymirad, Shon, et al.; "The Portable Patient File: An Intelligent Automated Medical Record;" The Proceedings of MEDINFO; Jan. 1989; pp. 784–789.

Nichols, Karen J.; "The Johns Hopkins Hospital Asthma Clinic—An Automated System;" Proceedings of the Annual Symposium on Computer Applications in Medical Care; Nov. 1985; pp. 497–501.

Nichols, Karen J., et al.; "The Johns Hopkins Hospital Discharge Instructions Application;" Proceedings of the Annual Symposium on Computer Applications in Medical Care; Nov. 1987; pp. 401–405.

O'Kane, Kevin, et al.; "Generalized Protocol Driven Problem Oriented Clinical Data Management and Monitoring;" Proceedings of the ACM 1980 Annual Conference; 1980; pp. 433–438.

Osburn, A. Eugene, D.O., et al.; "Enhancement to COSTAR;" Information Systems for Patient Care, Chapter 23; 1984; pp. 314–321; reprinted from The Fifth Annual Symposium on Computer Applications in Medical Care, Nov. 1–4, 1982.

Pascal, Fabian; "A Brave New World? Exploit the relational power and the graphical, multitasking, and connectivity facilities of the new database environments;" Byte Magazine, vol. 14, Issue 9; Sep. 1989; pp. 247–250.

Peckham, Ben M., et al.; "Computerized Data Collection in the Management of Uterine Cancer;" Dysplasia and Carcinoma In Situ of the Cervix; Dec. 1967; 2 cover pages and pp. 1003–1015.

Powell, H., et al.; "Promis in Primary Care Demonstration of a Computerized Problem–Oriented Medical Information System in Primary Care;" Proceedings of the Annual Symposium on Computer Applications in Medical Care; Nov. 1981; pp. 760–764.

Powers, Bernard J.; "A Clinical Research Data Base System for the Apple IIe/IIc;" Computers in Biology and Medicine; vol. 16, No. 5; Feb. 1986; pp. 391–398.

Principi, Eugene G.; "Better Care, Shorter Stays, Thanks to Networking;" Data Communications, Nov. 1986; pp. 189–194 and 197–198.

Pryor, T. A., et al.; "A Distributed Processing System for Patient Management;" Computers in Cardiology; Sep. 1978; pp. 325–328.

Pryor, T. A., et al.; "HELP—A Total Hospital Information System;" Proceedings of the Annual Symposium on Computer Applications in Medical Care; Nov. 1980; pp. 3–7.

Pryor, T. A., Ph.D; "The HELP Medical Record System;" M.D. Computing, vol. 5, No. 5; 1988; pp. 22–33.

Pryor, T. A., et al.; "The HELP System;" Journal of Medical Systems, vol. 7, No. 2; Apr. 1983; pp. 87–102.

Pryor, T. A., et al.; "The HELP System;" Reprinted from Proceedings of the Sixth Annual Symposium on Computer Applications in Medical Care; Oct.–Nov. 1982; pp. 19–27.

Quaak, Martien J., et al.; "Automation of the Patient History—Evaluation of Ergonomic Aspects;" International Journal of Bio–Medical Computing; vol. 21(3–4); Nov. 1987; pp. 287–298.

Rabbani, Usman, et al.; "A COSTAR Interface Using WWW Technology;" Proc AMIA Symp. 1998; 703–707.

Report Generator; "Installation of the Report Generator;" Marked Confidential; Revisions: 2–4; Mar. 28, 1988 through Feb. 5, 1996; pp. 1–29.

Robb, R.A., et al.; "A Workstation for Multi-Dimensional Display and Analysis of Biomedical Images;" Computer Methods and Programs in Biomedicine; vol. 25; No. 2; 1987; pp. 169–184.

Robinson, III, Robert E.; "Patholoy Subsystem;" Hospital Computer Systems; Chapter 8; 1974; pp. 194–205.

Rockart, John F., et al.; "An Automated Medical History System;" Archives of Internal Medicine; vol. 132; Sep. 1973; pp. 348–358.

Safran, Charles et al.; "Computer-Based Support for Clinical Decision Making;" M.D. Computing; vol. 7, No. 5; Sep.–Oct. 1990; pp. 319–322.

Safran, Charles, et al.; "Management of Information in Integrated Delivery Networks;" Chapter 10; Medical Informatics: Computer Applications in Health Care and Biomedicine; 2000; pp. 369–407.

Saxon, Charle, S.; "Computer-aided Drafting of Legal Documents;" American Bar Foundation Research Journal; vol. 1982, No. 3; Summer 1982; 2 cover pages and pp. 685–754.

Saxon, Charle, S.; "Computer Aided Drafting of Legal Documents;" A Dissertation Submitted in Partial Fulfillment of the Requirements for the Degree of Doctor of Philosophy in the University of Michigan; 1981; 172 pages.

Schlager, David D.; "A Comprehensive Patient Care System for the Family Practice;" Information Systems for Patient Care, Chapter 26; 1984; pp. 338–347; reprinted from Journal of Medical Systems 7, 1983.

Schmidt, E.C., et al.; "Computerized Problem-Oriented Medical Record for Ambulatory Practice;" Medical Care; Apr. 1974; vol. XII; No. 4; pp. 316–327.

Schultz, Jan R., et al.; "The Technology of PROMIS;" Proceedings of the IEEE; vol. 67, Issue 9; Sep. 1979; pp. 1237–1244.

Schwartz, M.D., et al.; "Labor and Delivery Information System;" Proceedings of the Ninth Annual Symposium on Computer Applications in Medical Care; Nov. 1985; cover page and pp. 139–143.

Seiver, Adam, et al.; "Bedside Computers in the Surgical Intensive Care Unit;" Angiology; vol. 38, No. 3; Mar. 1987; pp. 248–252.

Shabot, M. Michael, et al.; "Graphical Reports and Displays for Complex ICU Data: A New, Flexible and Configurable Method;" Proceedings of the Annual Symposium on Computer Applications in Medical Care; Nov. 13, 1985; pp. 418–421.

Shahar, Yuval, M.D., Ph.D.; "Computer-Based Patient Records and Medical Informatics Standards;" Medical Decision Suppot Systems; undated; 32 pages.

Shapiro, Alan R., M.D.; "SCAMP System;" Information Systems for Patient Care, Chapter 17; 1984; pp. 249–259.

Shaw, Richard Hale; "SQL: An Emerging Database Standard for PCs;" PC Magazine; May 17, 1988; pp. 275–279.

Simborg, Donald W., et al.; "Summary Time Oriented Record (STOR)—A Progress Report;" Proceedings of the Annual Symposium on Computer Applications in Medical Care; Nov. 1981; pp. 100–103.

Slack, Warner V., et al.; "Computer-Based Patient Interviewing;" Postgraduate Medicine; vol. 43, No. 3; Mar. 1968; pp. 68–74.

Slack, Warner V., M.D., et al.; "A Computer-Based Physical Examination System;" The Journal of the American Medical Association; vol. 200, No. 3; Apr. 1967; pp. 224–228.

Slack, Warner V., M.D.; "A History of Computerized Medical Interviews;" M.D. Computing vol. 1, No. 5; 1984; pp. 52–59 and 68.

Slack, Warner V., et al.; "Patient-Computer Dialogue;" The New England Journal of Medicine; vol. 286, No. 24; Jun. 1972; pp. 1304–1309.

Sprowl, James, et al.; "An Expert System for Drafting Legal Documents;" AFIPS Conference Proceedings, 1984 National Computer Conference; Jul. 9–12, 1984; AFIPS Press; (Reston, Virginia, U.S.); cover page and pp. 667 and 669–673.

Stead, W.W., et al.; "A Chartless Record—Is It Adequate?" Journal of Medical Systems; vol. 7, No. 5; 1983; pp. 103–109.

Stead, William W. M.D., et al.; "Computer-Based Medical Records: The Centerpiece of TMR;" M.D. Computing, vol. 5, No. 5; 1988; pp. 48–62.

Stead, William, et al.; "Demand-Oriented Medical Records: Toward a Physician Work Station;" Proceedings of the Annual Symposium on Computer Application in Medical Care; Nov. 1987; pp. 275–280.

Stead, William W.; "A New Biennium;" M.D. Computing; vol 5, No. 5; AAMSI News; cover page, pp. 6–7, plus 1 page.

Studney, D.R., M.D. et al.; "A COSTAR Quality Assurance Program in Private Practice;" Information Systems for Patient Care, Chapter 22; 1984; pp. 308–313.

Tang, Paul C., et al.; "Computer-Based Patient-Record Systems;" Medical Informatics: Computer Applications in Health Care and Biomedicine (Health Informatics), Chapter 9; 2000; pp. 335–370.

Templeton, Arch W., et al.; "Digital Image Management Networks: Current Status;" Radiology; Oct. 1988; vol. 169, No. 1; 193–199.

Timpka, Toomas; "Introducing Hypertext in Primary Health Care: A Study on the Feasibility of Decision Support for Practitioners;" Computer Methods and Programs in Biomedicine, vol. 29; 1989; pp. 1–13.

Tsichritzis, D.; "Form Management;" Communications of the ACM; vol. 25, No. 7; Jul. 1982; pp. 453–478.

Van Cura, Lawrence J., et al.; "Elements of a Computer Medical Interview System;" Biomedical Sciences Instrumentation, vol. 8; 1971; pp. 33–42.

Walton, Peter L., et al.; "Medical Guidance and PROMIS;" Computer; vol. 12, Issue 11; Nov. 1979; pp. 19–27.

Warner, Homer R., et al.; "A Sequential Bayesean Approach to History Taking and Diagnosis;" Computers and Biomedical Research; vol. 5, No. 3; Jun. 1972; pp. 256–262.

Weed, Lawrence L.; "Computerization of the Medical Record;" Medical Records, Medical Education, and Patient Care; Chapter 10; 1970; pp. 109–122.

Whiting–O'Keefe, Quinn E., M.D., et al.; "A Computerized Summary Medical Record System Can Provide More Information Than the Standard Medical Record;" The Journal of the American Medical Association, vol. 254, No. 9; Sep. 6, 1985; pp. 1185–1192.

Whiting–O'Keefe, Q. E., M.D., et al.; "The Stor Clinical Information System;" M.D. Computing, vol. 5, No. 5; 1988; pp. 8–21.

Willard, Oliver T.; "Barcodes in a Medical Office Computer System Experience with Eight Million Data Entry Operations;" Proceedings of the Annual Symposium on Computer Applications in Medical Care; Nov. 13, 1985; pp. 72–76.

Zielstorff, R.D., et al.; "A COSTAR—Based Multidisciplinary Record System for Coordination of Long–Term Care for the Elderly;" Mug Quarterly; vol. XVI, No. 4; Sep. 1987; pp. 13–16.

"Electronic Medical Records—Why Their Time Has Come;" 2003; pp. 1–12 (Exhibit 26 from the Deposition of Dr. John Dowdle).

American Health Information Management Association; "Authentication Issues;" prior to Oct. 10, 1993; 4 pages.

American Health Information Management Association; "Language for Model Health Information Legislation on Creation, Authentication and Retention of Computer–Based Records;" Draft; Jul. 6, 1994; pp. 1–5.

American Health Information Management Association; "Position Statement;" Sep. 1993; 1 page.

American Health Information Management Association; Fax including "Condition of Participation: Medical Records Services, Health Care Financing Administration, 42 CFR, Chapter 4, § 482.24" and miscellaneous state regulations; Jun. 30, 1995; 2 pages.

American Health Information Management Association; Fax of California Statute on Electronic Signatures; "Assembly Bill No. 3163, Chapter 631;" Oct. 5, 1994; cover sheet and 1 page.

Assignment of Patent Rights From Ken Buchanan and John A. Dowdle, M.D. to Medical Documenting Systems, Inc.; Apr. 30, 1990; 2 pages.

Atkinson III, James D.; "Letter to John P. Sumner regarding DocuMed;" Nov. 13, 1989; 1 page and enclosed "License Agreement;" 20 pages.

ATT1.LAW; "Summary of State Laws Pertaining to the Use of Electronic Signatures in Medical Records;" Dec. 1993; pp. 1–4.

Caywood, Donna; "Combined Declaration Under Sections 8 and 15;" Feb. 5, 1996; 2 pages.

Clifford, John A.; "Letter to DOCUMEDIX, Inc. regarding potential trademark infringement;" Mar. 27, 2000; 2 pages.

Dahlgren, Jennifer; "Medical Office Management; Easy Documentation; Physician develops software to make documentation faster and more accurate in a medical practice;" Physicians & Computers, Apr. 1993; 6 pages.

Dahlgren, Jennifer; "Medical Software; if you find that filling out patient encounter forms is stealing too much of your time each day, read on. These two physicians found a way to deal with that dilemma;" Physicians & Computers, vol. 8, No. 10; Feb. 1991; 5 pages.

DocuMed, Inc.; "Acquire the Power to Compete in Today's Healthcare Market;" 2000; 2 pages.

DocuMed, Inc.; "DocuMed Home Page;" www.documed.com; Dec. 28, 1999; 3 pages.

DocuMed, Inc.; "DocuMed Trial Version 4.3;" 2000; 2 pages.

DocuMed, Inc.; "Electronic Medical Records Made Easy;" 2002; 1 page.

DocuMed, Inc.; "Introducing DocuMed 2002;" 1 page.

DocuMed, Inc.; "DocuMed Sold;" Feb. 22, 1999; 2 pages.

DocuMed, Inc.; "DocuMed Electronic Clinical Office;" 2008; 2 pages.

Dowdle, John; "Memorandum to Jim Atkinson regarding information needed to complete application for federal registration of the M.D.S. logo;" Dec. 31, 1990; 1 page.

Federal Register; "Part VII, Department of Health and Human Services, Food and Drug Administration, 21 CFR Part 11, Electronic Signatures; Electronic Records; Proposed Rule;" vol. 59, No. 168; Aug. 31, 1994; cover page and pages 45160–45177.

Feste, Laura K.; "Letter to Paul Schyve, MD regarding auto signature program usage;" Feb. 18, 1993; 3 pages.

Grzybowski, Darice M.; "The Transition from Signature to Authorship;" Journal of AHIMA, vol. 64, No. 9; Sep. 1993; pp. 80–82, 84, 86, 88, and 90.

Hinsdale Hospital; Fax Regarding "Authorization for Use of Electronic Signature Authentication for Dicatated Reports;" Jul. 22, 1994; 9 pages.

HotList; "Electronic Medical Records;" Computers in Healthcare; Oct. 1993; pp. 46, 48, 50, 54, 59, and 60.

Huff, Cynthia; "The Bucks Start Here;" Healthcare Informatics; Jun. 2004; pp. 27–30, 32, 34, 36, 38, 40, 44, 46, 48, 50, 52, 54, and 56.

Journal of AHIMA, vol 64, No. 11; Nov. 1993; pp. 87–89.

McNair, Norman; "Letter to Nick Hernandez regarding Carefile;" Jun. 29, 1992; 2 pages; enclosures include: Carefile brochure, 2 pages; and Carefile Overview, 32 pages (Exhibit 73 from the Deposition of Shawn Dempster).

Medical Documenting Systems, Inc.; "Acquire the Power to Compete in Today's Healthcare Market;" 1996; 2 pages.

Medical Documenting Systems, Inc.; "DocuMed for Pen;" Photocopy of Base System Installation Version 1.1 Disk; Jun. 5, 1995; 1 page.

Medical Documenting Systems, Inc.; "DocuMed;" Photocopy of Version 2.1 Installation Disks 1 and 2; 1991; 2 pages.

Medical Documenting Systems, Inc.; "DocuMed Version 4.1 User's Guide;" 1997; 2 pages.

Medical Documenting Systems, Inc.; "DocuMed;" Photocopy of Demonstration Diskette Label; 1996; 1 page.

Medical Documenting Systems, Inc.; "The Total Solution for Automated Medical Records and Outcomes Management . . . ;" 1995; 10 pages.

Medical Documenting Systems, Inc.; "Trademark Registration Application;" undated; 3 pages.

Medical Documenting Systems, Inc.; "Would You Rather Be a Hammer or a Nail?" DocuMed Brochure; 2 pages.

Medical Documenting Systems, Inc.; "DocuMed—It's About Time;" 1990; 11 pages.

Medical Documenting Systems, Inc.; "DocuMed for Windows;" Photocopy of Version 3.0 Installation Disk # 1 of 3 Label; 1996; 1 page.

Medical Documenting Systems, Inc.; "DocuMed for Windows;" Photocopy of Version 4.1 Installation Disk # 1 of 6; 1997; 1 page.

Medical Documenting Systems, Inc.; "DocuMed for Windows;" Photocopy of Physical Therapy Trial Program Version 4.0 Installation Disk # 1 of 5; 1996; 1 page.

Medical Documenting Systems, Inc.; "DocuMed for Windows;" Photocopy of Version 4.0 Installation Disk # 1 of 5; 1996; 1 page.

Medical Documenting Systems, Inc.; "DocuMed for Windows;" Photocopy of Modems Program Version 4.0 Installation Disk # 3 of 6; 1996; 1 page.

Medical Documenting Systems, Inc.; "DocuMed for Windows;" Photocopy of Version 3.0 Disk # 1; 1995; 1 page.

Medical Documenting Systems, Inc.; "DocuMed for Windows;" Photocopy of Version 4.2 Installation Disk # 1 of 6; 1997; 1 page.

Medical Documenting Systems, Inc.; "DocuMed for Windows 2.5 StandAlone;" Photocopy of Installation Disk 1 of 3; 1992; 1 page.

Medical Documenting Systems, Inc.; "DocuMed for Windows 2.5;" Photocopy of Network Installation Diskette; Disk 1 of 3; 1993; 1 page.

Medical Documenting Systems, Inc.; "Software Licensing Agreement;" 1995; 2 pages.

Merchant & Gould, PC; "Billed and Unbilled Recap of Time Detail;" Jul. 9, 2009; 16 pages (Exhibit 68 from the Deposition of Shawn Dempster).

Merchant & Gould, PC; "CareFile Conflict of Interest Materials;" Jul. 16, 1992; 5 pages.

Pfau, James F.; "Letter to Fulvio Castelli regarding Carefile;" Jul. 18, 1992; 1 page (Exhibit 8 from the Deposition of Dr. John Dowdle).

Pfau, James F.; "Verified Statement (Declaration) Claiming Small Entity Status (37 C.F.R. 1.9(f) and 1.27(c)—Small Business Concern;" Jul. 11, 1990; 1 page.

Rudowski, Betsy; "Using DocuMed, Physicians Can 'Quantify Their Quality;'" Managed Healthcare News, vol. 10, No. 7; Jul. 1994; 2 pages.

Schumann, Michael D., et al.; "New Revisions to China's Patent Law Take Effect;" The International Computer Lawyer; vol. 1, No. 6; May 1993; 1 page.

Schyve, Paul M.; "Letter to Laura K. Feste Regarding American Health Information Management Association;" Joint Commission on Accreditation of Healthcare Organizations; Mar. 17, 1993; 5 pages.

Stead, William W.; "Systems for the Year 2000: the Case for an Integrated Database;" M.D. Computing, vol. 8, No. 2; 1991; p. 103, 104, 106, and 108–110.

Sumner, John P.; "Letter to Ken Buchanan regarding patent application;" Nov. 14, 1990; 2 pages (Exhibit 91 from the Deposition of Thomas Brennan).

Sumner, John P.; "Letter to the United States Patent Office regarding Submission of Missing Parts for U.S. Appl. No. 07/847,292;" May 4, 1989; 3 pages (Exhibit 7 from the Deposition of Dr. John Dowdle).

Tirone, Anthony J.; Memorandum re "Authentication of Medical Records—Clarifying Additional Guidance to Surveyors;" Feb. 9, 1994; 2 pages.

Tirone, Anthony J.; Memorandum re "Auto–authentication of Medical Records;" Mar. 18, 1993; 5 pages.

United States Patent and Trademark Office; Trademark Principal Register; Documed; Reg. No. 1,593,989; Registered May 1, 1990; 1 page.

Wallace, Scott; "The Computerized Patient Record;" Byte; May 1994; pp. 67, 68, 70, 72, 74, and 75.

Workshop Schedule; Including "New Computerized Medical Record Systems;" Mar. 5, 1992; 1 page.

Wright, Linda M.; "Letter to John A. Clifford, Esq. with Trademark Preliminary Registrability Search for Documed;" Jul. 31, 1992; 5 pages.

Zeglen, Margaret; "The Impact of Computer–Key Signatures on Medical Records;" Apr. 1, 1994; 16 pages.

Zupko, Karen A.; "The Very Best Way to Organize Patient Records;" Medical Economics, Jul. 25, 1994; pp. 75–77, 81, 82, and 85.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-27 is confirmed.

* * * * *